(12) United States Patent
Sakhnini et al.

(10) Patent No.: US 12,010,049 B2
(45) Date of Patent: Jun. 11, 2024

(54) MIXED-WAVEFORM COMMUNICATIONS

(71) Applicant: QUALCOMM Incorporated, San Diego, CA (US)

(72) Inventors: Iyab Issam Sakhnini, San Diego, CA (US); Tao Luo, San Diego, CA (US); Juan Montojo, San Diego, CA (US); Xiaoxia Zhang, San Diego, CA (US); Jun Ma, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 212 days.

(21) Appl. No.: 17/133,537

(22) Filed: Dec. 23, 2020

(65) Prior Publication Data

US 2022/0200746 A1 Jun. 23, 2022

(51) Int. Cl.
*H04J 11/00* (2006.01)
*H04L 5/00* (2006.01)
*H04W 56/00* (2009.01)

(52) U.S. Cl.
CPC ........ *H04L 5/0037* (2013.01); *H04J 11/0073* (2013.01); *H04W 56/0035* (2013.01); *H04J 2011/0096* (2013.01)

(58) Field of Classification Search
USPC ........................................................ 370/329
See application file for complete search history.

(56) References Cited

U.S. PATENT DOCUMENTS

2018/0287840 A1* 10/2018 Akkarakaran ........ H04L 27/262
2019/0261315 A1* 8/2019 Zhang .................. H04L 1/0001

FOREIGN PATENT DOCUMENTS

WO WO-2021084333 A1 * 5/2021 ......... H04L 27/2613
WO WO-2021176267 A1 * 9/2021

* cited by examiner

*Primary Examiner* — Jeffrey M Rutkowski
*Assistant Examiner* — Luna Weissberger
(74) *Attorney, Agent, or Firm* — Holland & Hart LLP

(57) ABSTRACT

Methods, systems, and devices for wireless communications are described. A wireless device may monitor for a transmission of a synchronization signal block that includes a first portion generated using a first waveform type and a second portion using a second waveform type that is different than the first waveform type. The wireless device may detect the first portion of the synchronization signal block based on the first waveform type used for the first portion. After detecting the first portion of the synchronization signal block, the wireless device may process the second portion of the synchronization signal block based on information obtained from the first portion of the synchronization signal block. The information obtained from the first portion of the synchronization signal block may include timing information, frequency information, or both.

27 Claims, 14 Drawing Sheets

MIXED-WAVEFORM COMMUNICATIONS

FIELD OF TECHNOLOGY

The following relates to wireless communications, including mixed-waveform communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may use an initial access procedure to establish an initial connection with a base station. In some examples, the base station transmits signals that enable the UE to synchronize timing and frequency information at the UE with timing and frequency at the base station. In some examples, the UE performs a blind detection process to identify the signals used to synchronize with the base station.

SUMMARY

The described techniques relate to improved methods, systems, devices, and apparatuses that support mixed-waveform communications. A wireless device may monitor for a transmission of a synchronization signal block that includes a first portion generated using a first waveform type and a second portion using a second waveform type that is different than the first waveform type. The wireless device may detect the first portion of the synchronization signal block based on the first waveform type used for the first portion. After detecting the first portion of the synchronization signal block, the wireless device may process the second portion of the synchronization signal block based on information obtained from the first portion of the synchronization signal block. The information obtained from the first portion of the synchronization signal block may include timing information, frequency information, or both.

A method for wireless communication at a user equipment (UE) is described. The method may include monitoring for a transmission of a synchronization signal block that includes a first portion generated in accordance with a first waveform type and a second portion generated in accordance with a second waveform type that is different than the first waveform type, detecting, based on the monitoring, the first portion based on the first waveform type, and processing, based on the detecting, the second portion based on information obtained from the first portion.

An apparatus for wireless communication at a UE is described. The apparatus may include a processor, memory in electronic communication with the processor, and instructions stored in the memory. The instructions may be executable by the processor to cause the apparatus to monitor for a transmission of a synchronization signal block that includes a first portion generated in accordance with a first waveform type and a second portion generated in accordance with a second waveform type that is different than the first waveform type, detecting, base at least in part on the monitoring, the first portion based on the first waveform type, and process, based on the detecting, the second portion based on information obtained from the first portion.

Another apparatus for wireless communication at a UE is described. The apparatus may include means for monitoring for a transmission of a synchronization signal block that includes a first portion generated in accordance with a first waveform type and a second portion generated in accordance with a second waveform type that is different than the first waveform type, means for detecting, based on the monitoring, the first portion based on the first waveform type, and means for processing, based on the detecting, the second portion based on information obtained from the first portion.

A non-transitory computer-readable medium storing code for wireless communication at a UE is described. The code may include instructions executable by a processor to monitor for a transmission of a synchronization signal block that includes a first portion generated in accordance with a first waveform type and a second portion generated in accordance with a second waveform type that is different than the first waveform type, detecting, base at least in part on the monitoring, the first portion based on the first waveform type, and process, based on the detecting, the second portion based on information obtained from the first portion.

Some examples of the method, apparatuses, and non-transitory computer-readable medium described herein may further include operations, features, means, or instructions for determining the first waveform type for the first portion based on a configuration of the UE, a frequency of the transmission of the synchronization signal block, or both.

Some examples of the method, apparatuses, and non-transitory computer-readable medium described herein may further include operations, features, means, or instructions for determining the second waveform type for the second portion based on determining the first waveform type for the first portion, an indication of the second waveform type included in the first portion, the configuration of the UE, the frequency of the transmission of the synchronization signal block, or any combination thereof.

In some examples of the method, apparatuses, and non-transitory computer-readable medium described herein, monitoring for the transmission may include operations, features, means, or instructions for testing, for each time window of a set of multiple time windows, a set of multiple hypotheses associated with detecting the first portion of the synchronization signal block, the set of multiple hypotheses including a set of multiple sequences, a set of multiple frequencies, a set of multiple waveform types, or any combination thereof.

Some examples of the method, apparatuses, and non-transitory computer-readable medium described herein may further include operations, features, means, or instructions for determining first timing information based on the first portion of the synchronization signal block, where the first timing information supports a first timing resolution based on the first waveform type and receiving, after processing the second portion and based on determining the first timing information, a data transmission including symbols having a duration, where the first timing resolution supports the duration of the symbols.

In some examples of the method, apparatuses, and non-transitory computer-readable medium described herein, a duration of the first portion may be equivalent to a duration of each time window of the set of multiple time windows and greater than the duration of the symbols of the data transmission.

In some examples of the method, apparatuses, and non-transitory computer-readable medium described herein, the first waveform type may be one of a single carrier waveform type, a single carrier-frequency division multiplexing type, or an orthogonal frequency division multiplexing type, and the second waveform type may be one of the single carrier waveform type, the single carrier-frequency division multiplexing type, or the orthogonal frequency division multiplexing type.

In some examples of the method, apparatuses, and non-transitory computer-readable medium described herein, the synchronization signal block includes a third portion generated in accordance with a third waveform type and the method, apparatuses, and non-transitory computer-readable medium may include further operations, features, means, or instructions for determining the third waveform type for the third portion based on determining the first waveform type, determining the second waveform type, an indication of the first waveform type included in the first portion, an indication of the second waveform type included in the second portion, a configuration of the UE, a frequency of the transmission of the synchronization signal block, an order of the first portion relative to the second portion, or any combination thereof.

In some examples of the method, apparatuses, and non-transitory computer-readable medium described herein, and the method, apparatuses, and non-transitory computer-readable medium may include further operations, features, means, or instructions for processing the third portion based on information obtained from the first portion.

In some examples of the method, apparatuses, and non-transitory computer-readable medium described herein, the first waveform type may be one of a single carrier waveform type or an orthogonal frequency division multiplexing type, the second waveform type may be one of the single carrier waveform type or the orthogonal frequency division multiplexing type, and the third waveform type may be one of a single carrier-frequency division multiplexing type, the single carrier waveform type, or the orthogonal frequency division multiplexing type.

In some examples of the method, apparatuses, and non-transitory computer-readable medium described herein, the first waveform type may be a single carrier waveform type, the second waveform type may be an orthogonal frequency division multiplexing type, and the third waveform type may be a single carrier-frequency division multiplexing type.

In some examples of the method, apparatuses, and non-transitory computer-readable medium described herein, the third portion of the synchronization signal block may be transmitted using a first set of subcarriers and multiplexed with a second transmission that may be transmitted using a second set of subcarriers.

A method for wireless communication at a base station is described. The method may include determining a first waveform type to use for a first portion of a synchronization signal block and a second waveform type to use for a second portion of the synchronization signal block, the second waveform type being different than the first waveform type, generating the first portion and the second portion of the synchronization signal block based on the determining, and transmitting the synchronization signal block based on the generating.

An apparatus for wireless communication at a base station is described. The apparatus may include a processor, memory in electronic communication with the processor, and instructions stored in the memory. The instructions may be executable by the processor to cause the apparatus to determine a first waveform type to use for a first portion of a synchronization signal block and a second waveform type to use for a second portion of the synchronization signal block, the second waveform type being different than the first waveform type, generate the first portion and the second portion of the synchronization signal block based on the determining, and transmit the synchronization signal block based on the generating.

Another apparatus for wireless communication at a base station is described. The apparatus may include means for determining a first waveform type to use for a first portion of a synchronization signal block and a second waveform type to use for a second portion of the synchronization signal block, the second waveform type being different than the first waveform type, means for generating the first portion and the second portion of the synchronization signal block based on the determining, and means for transmitting the synchronization signal block based on the generating.

A non-transitory computer-readable medium storing code for wireless communication at a base station is described. The code may include instructions executable by a processor to determine a first waveform type to use for a first portion of a synchronization signal block and a second waveform type to use for a second portion of the synchronization signal block, the second waveform type being different than the first waveform type, generate the first portion and the second portion of the synchronization signal block based on the determining, and transmit the synchronization signal block based on the generating.

Some examples of the method, apparatuses, and non-transitory computer-readable medium described herein may further include operations, features, means, or instructions for transmitting a data transmission to a UE, where the first waveform type may be determined based on a duration of symbols included in the data transmission, a duration of the synchronization signal block, power characteristics of the synchronization signal block, or any combination thereof.

Some examples of the method, apparatuses, and non-transitory computer-readable medium described herein may further include operations, features, means, or instructions for determining the first waveform type includes selecting the first waveform type based on a carrier frequency associated with transmitting the synchronization signal block and determining the second waveform type includes selecting the second waveform type based on the carrier frequency associated with transmitting the synchronization signal block, or both.

In some examples of the method, apparatuses, and non-transitory computer-readable medium described herein, determining the first waveform type and the second waveform type may include operations, features, means, or instructions for selecting the first waveform type from one of a single carrier waveform type or an orthogonal frequency division multiplexing type and selecting, based on selecting the first waveform type, the second waveform type from one of the single carrier waveform type or the orthogonal frequency division multiplexing type.

Some examples of the method, apparatuses, and non-transitory computer-readable medium described herein may further include operations, features, means, or instructions for selecting a single carrier waveform type for the first waveform type and where generating the synchronization signal block includes generating a time-domain sequence for the first portion based on selecting the single carrier waveform type.

In some examples of the method, apparatuses, and non-transitory computer-readable medium described herein, the time-domain sequence indicates the second waveform type used for the second portion of the synchronization signal block.

In some examples of the method, apparatuses, and non-transitory computer-readable medium described herein, determining the first waveform type and the second waveform type may include operations, features, means, or instructions for determining a third waveform type to use for a third portion of the synchronization signal block, where the third portion may be associated with a physical broadcast channel.

In some examples of the method, apparatuses, and non-transitory computer-readable medium described herein, determining the third waveform type may include operations, features, means, or instructions for selecting the third waveform type from one of a single carrier-frequency division multiplexing type, a signal carrier type, or an orthogonal frequency division multiplexing type.

Some examples of the method, apparatuses, and non-transitory computer-readable medium described herein may further include operations, features, means, or instructions for mapping the third portion of the synchronization signal block to a first subset of frequency resources and mapping a transmission associated with a different communication channel to a second subset of the frequency resources that may be different than the first subset of the frequency resources.

Some examples of the method, apparatuses, and non-transitory computer-readable medium described herein may further include operations, features, means, or instructions for applying a discrete Fourier transform to a first set of symbols associated with the third portion and a second set of symbols associated with the different communication channel to obtain a set of frequency-domain symbols and where mapping the third portion of the synchronization signal block and the transmission associated with the different communication channel including mapping the set of frequency-domain symbols to the frequency resources.

Some examples of the method, apparatuses, and non-transitory computer-readable medium described herein may further include operations, features, means, or instructions for applying a first discrete Fourier transform to a first set of symbols associated with the third portion to obtain a first set of frequency-domain symbols, applying a second discrete Fourier transform to a second set of symbols associated with the transmission associated with the different communication channel to obtain a second set of frequency-domain symbols, and where mapping the third portion of the synchronization signal block and the transmission associated with the different communication channel including mapping the first set of frequency-domain symbols and the second set of frequency-domain symbols to the frequency resources.

In some examples of the method, apparatuses, and non-transitory computer-readable medium described herein, a quantity of the first set of frequency-domain symbols may be less than a quantity of the second set of frequency-domain symbols.

DETAILED DESCRIPTION

Figure 1:
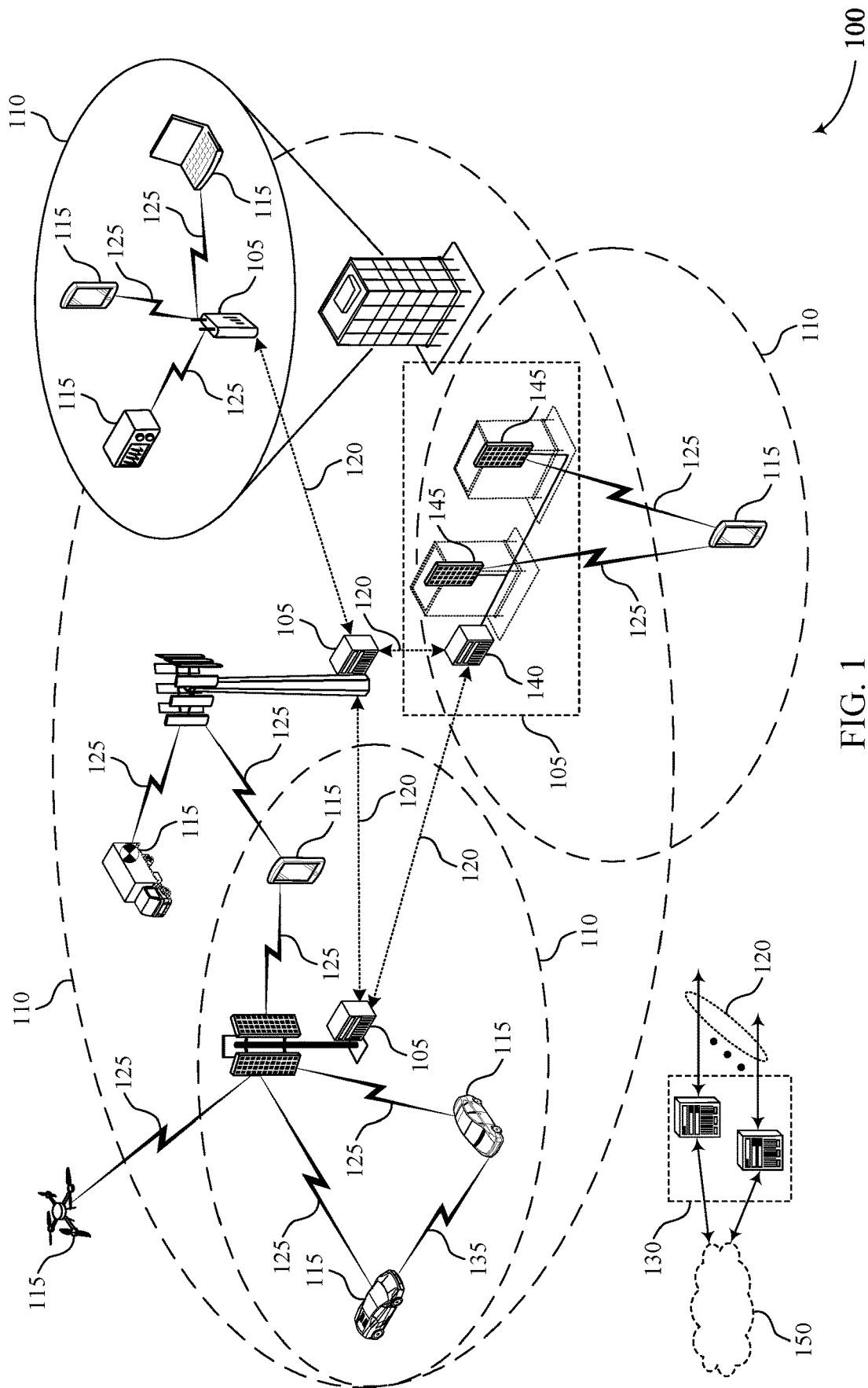
FIG. 1 illustrates an example of a wireless communications system that supports mixed-waveform communications in accordance with aspects of the present disclosure.

A wireless device may obtain, during an initial access procedure, timing, frequency, and system information for one or more cells based on synchronization signal and physical broadcast channel (PBCH) blocks (which may also be referred to as synchronization signal blocks (SSBs)) transmitted in the one or more cells. In some examples, a frequency and timing resolution for the frequency and timing information obtained from an SSB that uses a first subcarrier spacing (e.g., 120 KHz or 240 KHz) may be insufficient to receive and decode subsequent control and/or data symbols that use a second, higher subcarrier spacing (e.g., 960 KHz, 1,920 KHz, or 3,840 KHz).

To achieve a sufficient timing and/or frequency resolution, an SSB may be configured to use a higher subcarrier spacing (e.g., greater than or equal to 960 KHz). However, using a higher subcarrier spacing, may decrease a symbol duration of the SSB and increase a processing load at a receiving device associated with detecting the SSB. In another example, to achieve a sufficient timing and/or frequency resolution, an SSB may use time-domain sequences that provide a higher timing and frequency resolution while being transmitted in a similar duration as a symbol duration of an SSB that uses a lower subcarrier spacing (e.g., less than or equal to 240 KHz). But a transmitting device may be unable to multiplex in frequency other transmissions (e.g., other channel transmissions, such as a control channel) with an SSB that uses time-domain sequences.

In some examples, to obtain a timing and frequency resolution that supports communications over high frequency bands with a reduced (or no) impact to the processing load at a UE and while supporting a frequency division multiplexing capability, an SSB may be structured such that different portions of the SSB (e.g., a primary synchronization signal (PSS), secondary synchronization signal (SSS), and PBCH portion) use different waveform types. In some examples, the waveform types selected for the SSB may be selected to achieve desired timing and frequency resolutions while both maintaining a processing load below a threshold and supporting frequency division multiplexing. For example, a single carrier waveform may be used for a PSS, an orthogonal frequency division multiplexing (OFDM) waveform may be used for an SSS, and an SC-FDM waveform may be used for a PBCH transmission. Accordingly, a desired timing and frequency resolution may be obtained from the PSS without significantly reducing a duration of the PSS, and other transmissions (e.g., a control channel transmission) may be frequency multiplexed with the SSS and/or PBCH transmission.

In some examples, different waveform type combinations may be selected for different SSB transmissions—e.g., based on channel characteristics. For example, in some frequency ranges (e.g., sub-millimeter and millimeter wave frequencies) single carrier waveforms may be used for the PSS and SSS and an OFDM waveform may be used for a PBCH transmission. And in higher frequency ranges, a single carrier waveform may be used for a PSS, an OFDM waveform may be used for an SSS, and an SC-FDM waveform may be used for a PBCH transmission. In some examples, enhanced operations may be established to support using different combinations of waveforms for SSB transmissions. In some examples, a receiving device may determine a waveform used for a PSS of an SSB based on a carrier frequency used for the SSB. The receiving device may also determine a waveform used for an SSS of the SSB based on the carrier frequency of the SSB and/or based on the PSS (e.g., based on a waveform of the PSS or information included in the PSS). Similarly, the receiving device may determine a waveform used for a PBCH of the SSB based on the carrier frequency of the SSB, the PSS, the SSS, an ordering of the PSS and SSS, or any combination thereof.

Aspects of the disclosure are initially described in the context of wireless communications systems. Aspects of the disclosure are also described in the context of a resource configuration and process flow. Aspects of the disclosure are further illustrated by and described with reference to apparatus diagrams, system diagrams, and flowcharts that relate to mixed-waveform communications.

FIG. 1 illustrates an example of a wireless communications system 100 that supports mixed-waveform communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as OFDM or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$, may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time-domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time-domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Different wireless communication systems 100 may support different transmission techniques used to exchange information between wireless devices. In some examples, a wireless communications system 100 may support single carrier techniques that modulate information (e.g., control and/or data) using single carrier waveforms. Single carrier waveforms may be spread across a wide bandwidth and be modulated using a modulation technique (e.g., 4-QAM, 8-QAM, 16-QAM, or higher order QAM). Single carrier waveforms may exhibit low peak-to-average power ratio (PAPR) characteristics based on being spread across a wide bandwidth. Also, single carrier waveforms may be associated with low transmission and reception complexity based on single carrier waveforms being transmittable and/or receivable without performing a DFT or inverse discrete Fourier transform (IDFT). To support transmissions to multiple UEs 115, single carrier transmissions to multiple UEs 115 may be time-division multiplexed.

In some examples, a wireless communications system 100 may support OFDM techniques that modulate information using OFDM waveforms. OFDM waveforms may be transmitted over discrete sets of communication resources that are partitioned in time and frequency and may be modulated using a modulation technique (e.g., 4-QAM, 8-QAM, 16-QAM, or higher order QAM). OFDM waveforms may be transmitted over smaller bandwidths than single carrier waveforms. Also, to support transmissions to multiple UEs 115, OFDM transmissions to multiple UEs 115 may be time-division multiplexed. In some examples, PAPR characteristics of OFDM waveforms are greater than PAPR characteristics of single carrier waveforms—e.g., due to simultaneously transmitting multiple bandwidth-limited transmissions. Also, a complexity of transmitting and receiving OFDM transmissions may be increased relative to single carrier transmissions—e.g., based on using an IDFT in the transmitter and DFT in the receiver. That said, OFDM transmissions may provide high signal-to-noise ratio (SNR), high spectral efficiency, support high order MIMO, be received using a single tap FDE, support efficient bandwidth utilization (e.g., without guard bands), and readily support frequency division multiplexing.

In some examples, a wireless communications system 100 may support SC-FDM techniques that modulate data using SC-FDM waveforms. SC-FDM techniques may include DFT-s-OFDM techniques. Similar to OFDM waveforms, SC-FDM waveforms may be transmitted over discrete sets of communication resources that are partitioned in time and frequency and may be modulated using a modulation technique (e.g., 4-QAM, 8-QAM, 16-QAM, or higher order QAM). In some examples, SC-FDM waveforms may be spread across a same or wider bandwidth than OFDM waveforms while sharing characteristics of a single carrier transmissions. For example, SC-FDM waveforms may have lower PAPR than OFDM waveforms. SC-FDM waveforms may also share characteristics of OFDM waveforms. For example, SC-FDM waveforms may be received using a single tap FDE, support frequency division multiplexing, and support efficient bandwidth utilization.

A wireless communications system 100 may use synchronization signal and physical broadcast channel blocks (also referenceable as synchronization signal blocks or SSBs) to support wireless communications. In some examples, SSBs may be used to support an initial cell searching procedure and to communicate information about a cell (e.g., timing information, frequency information, system information, or any combination thereof). In some examples, an SSB spans four OFDM symbols, where one OFDM symbol is used for a PSS, two OFDM symbols are used for PBCH transmission, and one OFDM symbol is used for an SSS. In some examples, the OFDM symbol used for the SSS also includes PBCH transmissions, where the SSS and PBCH transmissions are frequency division multiplexed. In some examples, a base station 105 transmits an SSB in each beam supported by the base station 105.

A PSS may extend for one OFDM symbol and be generated in accordance with a frequency-domain sequence (e.g., a maximum length sequence, which may also be referred to as an m-sequence) that has a length (e.g., of 127) and is mapped to a corresponding quantity of subcarriers. In some examples, a sequence from a set of three possible sequences may be used for the PSS. An SSS may extend for one OFDM symbol and be generated in accordance with a frequency-domain sequence (e.g., a Gold code or Gold sequence, which may include two m-sequences) that has a length (e.g., of 127) and is mapped to a corresponding quantity of subcarriers. In some examples, a sequence from a set of 1008 possible sequences may be used for the SSS. A PBCH transmission may extend for one OFDM symbol and include data that has been modulated using a modulation technique (e.g., QPSK). A subcarrier spacing of the subcarriers used by the PSS, SSS, and PBCH transmission may be based on a frequency range used for communicating an SSB. In some examples, the subcarriers are spaced either 15 KHz apart or 30 KHz apart if the SSB is transmitted in FR1, while the subcarriers may be spaced either 120 KHz or 240 KHz apart if the SSB is transmitted in FR2.

A UE 115 may search for an SSB transmission after connecting to a wireless communications system 100 (e.g., powering on). In some examples, a UE 115 may use a sliding window and correlation technique to monitor for a PSS of an SSB. A duration of the sliding window may be equivalent to a duration of an OFDM symbol. In some examples, the UE 115 may compare signals received during discrete windows of the sliding window with the three possible sequences used for a PSS. For example, the UE 115 may use signals received during discrete windows of the sliding window that overlap with one another, such that a beginning of one window is separated by a beginning of a subsequent window by a duration that is a fraction (e.g., ½, ¼, ⅛) of an OFDM symbol duration—e.g., so that a beginning of one of the windows is aligned (e.g., closely) with a beginning of an OFDM symbol used for the PSS. In some examples, for the comparison of each sequence, the UE 115 may consider different frequency hypotheses that account for Doppler effects, internal clock frequency shifts, and other frequency errors.

After detecting the PSS, the UE 115 may determine timing information for the cell. That is, the UE 115 may identify a beginning and duration of OFDM symbols transmitted using the cell. In some examples, the accuracy of the timing information (e.g., the timing resolution) obtained by the UE is based on the spacing of the subcarriers used for the PSS—e.g., the accuracy of the timing information may increase as a subcarrier spacing increases. The UE 115 may use the information obtained from the PSS to identify a position of an SSS. Also, the UE 115 may use the SSS to determine additional information about the cell (e.g., such as a cell ID and/or additional timing information). Additionally, the UE 115 may use the information obtained from the PSS and SSS decode the PBCH transmission. In some examples, the UE 115 may use a demodulation reference signal (DMRS) that is correlated with the PBCH transmission to coherently demodulate the PBCH transmission.

A wireless communications system 100 may support communications over high frequency bands (e.g., sub-Terahertz) bands. In some examples, OFDM transmissions over high frequency bands have larger subcarrier spacings then OFDM transmissions over lower frequency bands (e.g., Gigahertz and millimeter wave bands). Thus, OFDM transmissions over high frequency bands may have shorter symbol periods and cyclic prefixes than OFDM transmission over lower frequency bands. In some examples, a cyclic prefix is proportional to a subcarrier spacing—e.g., for (1) a 960 KHz subcarrier spacing, a cyclic prefix may be 73.2 ns; (2) a 1,920 KHz subcarrier spacing, a cyclic prefix may be 36.6 ns; and (3) a 3,840 KHz subcarrier spacing, a cyclic prefix may be 18.3 ns.

In some examples, for SSB transmission over high frequency bands, a wireless communications system 100 may use a same structure used for SSB transmissions over lower frequency bands. For example, SSBs may be transmitted over subcarriers in the high frequency bands having a same subcarrier spacing and symbol period that is used for an FR2 frequency range (e.g., 120 KHz or 240 KHz spacing). By using the same subcarrier spacing and symbol period, a complexity associated with searching for SSBs in a high frequency range may remain the same as the complexity associated with searching for SSBs in a low frequency range. However, a timing resolution associated with the SSB may be insufficient for receiving and decoding control and/or data symbols transmitted over the high frequency bands using the higher subcarrier spacing and shorter symbol periods. For example, a timing resolution associated with receiving a PSS having a 120 KHz subcarrier spacing may be around 34.7 ns, while a cyclic prefix of a data symbol having a 1,920 KHz subcarrier spacing may be around 36.6 ns—a preferred cyclic prefix-to-time resolution ratio may be greater than or equal to two. Also, a timing resolution associated with receiving a PSS having a 240 KHz subcarrier spacing may be around 17.4 ns, while a cyclic prefix of a data symbol having a 3,840 KHz subcarrier spacing may be around 18.3 ns. Additionally, the subcarrier spacing of the PSS may be incompatible with larger frequency offsets of the SSB that can occur at high frequencies. Moreover, transmitting SSBs using the lower subcarrier spacing and longer symbol periods in high frequency bands may prevent the transmission of other data symbols for a longer amount of time than an SSB transmitted using a higher subcarrier spacing and short symbol period.

In some examples, to obtain a timing and frequency resolution that supports communications over high frequency bands, a modified SSB transmission may be used to support an initial cell search procedure. For example, an SSB that is transmitted using OFDM techniques may use a higher subcarrier spacing (e.g., 960 KHz, 1,920 KHz, or 3,840 KHz) to achieve a timing resolution that supports receiving control and/or data transmissions over high frequencies. However, using a higher subcarrier spacing may significantly decrease a duration of an OFDM symbol used to convey a PSS and thus, may increase a processing load at a UE 115 for detecting a PSS—e.g., by increasing a quantity of correlations performed per second.

In some examples, to obtain a timing and frequency resolution that supports communications over high frequency bands with a reduced (or no) impact to the processing load at the UE 115, an SSB may include a PSS and an SSS, where the PSS/SSS may be used to support an initial cell search procedure and detected using a low-complexity time detection technique. For example, the PSS and SSS may be generated using binary time-domain sequences, where the PSS sequence may be constructed to enable efficient time-domain correlation, and the SSS sequence may be constructed to enable fast detection in the time-domain. In some examples, the PSS/SSS is spread across a wide frequency (e.g., using a single carrier waveform), and a length of the binary symbols in a sequence may be significantly shorter than an OFDM symbol. In some examples, the PSS/SSS sequence may provide a time resolution that supports reception of control and/or data transmissions over high frequencies, while a length of the PSS/SSS may be similar to a length of an OFDM symbol having a subcarrier spacing below 240 KHz. But a transmitting device may be unable to multiplex in frequency other transmissions (e.g., other channel transmissions, such as a control channel) with an SSB that uses time-domain sequences.

In some examples, to obtain a timing and frequency resolution that supports communications over high frequency bands with a reduced (or no) impact to the processing load at the UE 115 and while supporting a frequency division multiplexing capability, an SSB may be structured such that different portions of the SSB (e.g., a PSS, SSS, and PBCH portion) use different waveform types. In some examples, the waveform types selected for the SSB may be selected to achieve desired timing and frequency resolutions while both maintaining a processing load below a threshold and supporting frequency division multiplexing. For example, a single carrier waveform may be used for a PSS, an OFDM waveform may be used for an SSS, and an SC-FDM waveform may be used for a PBCH transmission. Accordingly, a desired timing and frequency resolution may be obtained from the PSS without significantly reducing a duration of the PSS, and other transmissions (e.g., a control channel transmission) may be frequency multiplexed with the SSS and/or PBCH transmission.

In some examples, different waveform type combinations may be selected for different SSB transmissions—e.g., based on channel characteristics. For example, in some frequency ranges (e.g., sub-millimeter and millimeter wave frequencies) single carrier waveforms may be used for the PSS and SSS and an OFDM waveform may be used for a PBCH transmission. And in higher frequency ranges, a single carrier waveform may be used for a PSS, an OFDM waveform may be used for an SSS, and an SC-FDM waveform may be used for a PBCH transmission. In some examples, enhanced operations may be established to support using different combinations of waveforms for SSB transmissions. In some examples, a receiving device may determine a waveform used for a PSS of an SSB based on a carrier frequency used for the SSB. The receiving device may also determine a waveform used for an SSS of the SSB based on the carrier frequency of the SSB and/or based on the PSS (e.g., based on a waveform of the PSS or information included in the PSS. Similarly, the receiving device may determine a waveform used for a PBCH of the SSB based on the carrier frequency of the SSB, the PSS, the SSS, an ordering of the PSS and SSS, or any combination thereof.

Figure 2:
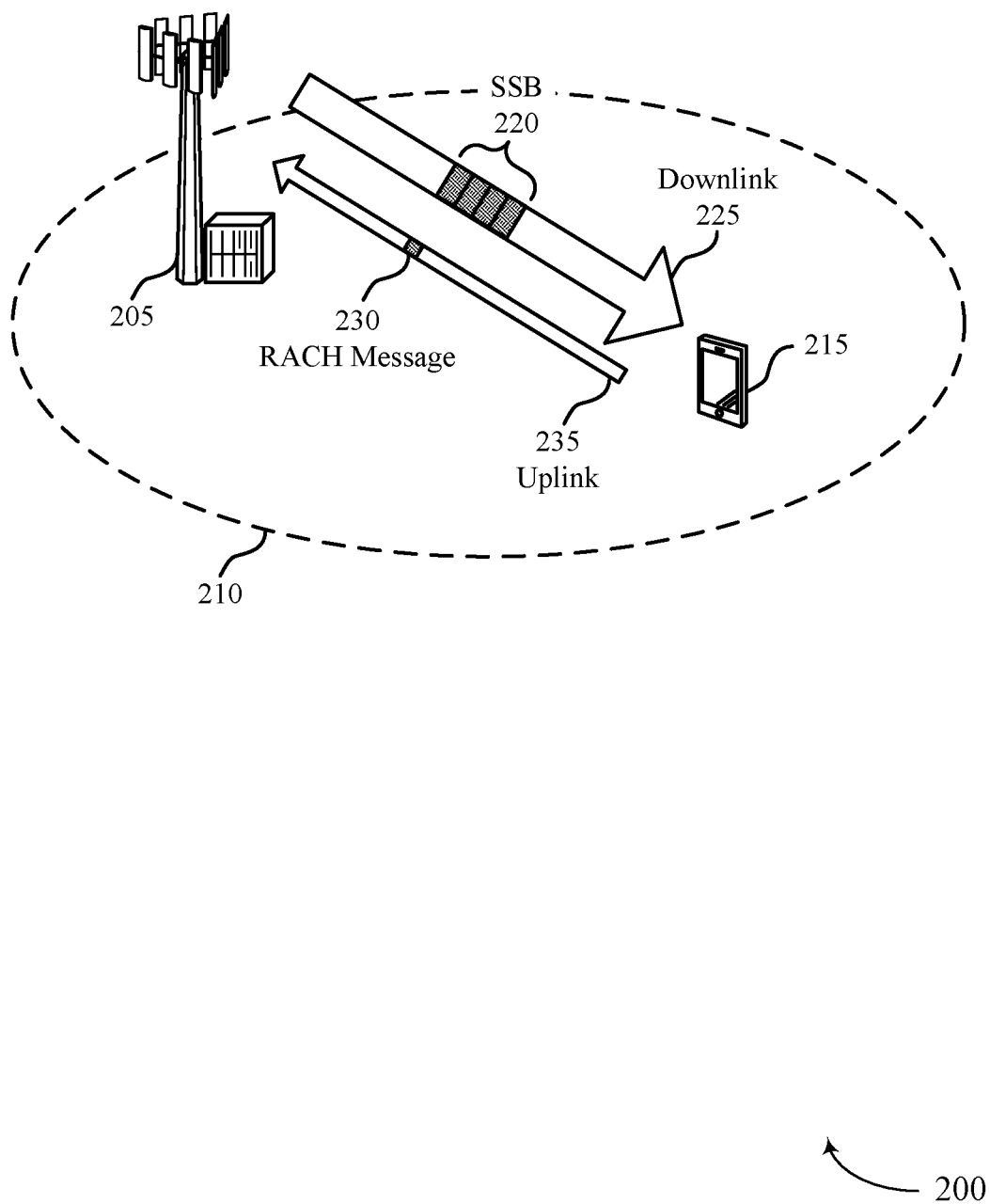
FIG. 2 illustrates an example of a wireless communications subsystem that supports mixed-waveform communications in accordance with aspects of the present disclosure.

FIG. 2 illustrates an example of a wireless communications subsystem that supports mixed-waveform communications in accordance with aspects of the present disclosure. Wireless communications subsystem 200 may include base station 205 and UE 215, which may be examples of a base station 105 and UE 115, as described with reference to FIG. 1. Base station 205 and UE 215 may communicate with one another within coverage area 210 via downlink 225 and uplink 235 using one or more of the techniques described in FIG. 1.

In some examples, base station 205 transmits SSB 220 to UE 215 via downlink 225. SSB 220 may be separated into different portions that include different signals (or combinations of signals). For example, a first portion of SSB 220 may include a PSS, a second portion of SSB 220 may include a PBCH transmission, and a third portion of SSB 220 may include an SSS. In some examples, a fourth portion of SSB 220 may include an additional PBCH transmission. In some examples, the third portion of SSB 220 may also include one or more additional PBCH transmissions that may be frequency multiplexed with the SSS. Base station 205 may use different waveform types for the different transmissions included in SSB 220. In some examples, base station 205 uses either a single carrier waveform or an OFDM waveform for the PSS, either a single carrier waveform or an OFDM waveform for the SSS, and one of an SC-FDM waveform, single carrier waveform, or an OFDM waveform for the PBCH. In some examples, base station 205 transmits multiple SSBs (including SSB 220) over multiple beams.

UE 215 may perform an operation that enables UE 215 to detect the transmission of SSB 220. In some examples, UE 215 compares signals received in a sliding window against a set of sequences that may be used for a PSS, considering frequency offsets that may occur based on the Doppler effect, internal clock frequency shifts, or other frequency errors. In some examples, UE 215 may process the signals received in the sliding window based on a set of sequences that are associated with one waveform type being used for the PSS—e.g., based on a carrier frequency used for SSB 220. For example, if UE 215 is searching for SSB 220 in a high frequency range (e.g., in a sub-Terahertz frequency range), UE 215 may compare the signals against a set of sequences associated with a single carrier waveform. Or if UE 215 is searching for SSB 220 in a lower frequency range (e.g., in a millimeter wave range), UE 215 may compare the signals against a set of sequences associated with an OFDM waveform. In some examples, UE 215 may process the signals received in the sliding window based on a set of sequences that are associated with different waveform types that may be used for the PSS. For example, UE 215 may compare the signals against sequences associated with a single carrier waveform, sequences associated with an SC-FDM waveform, sequences associated with an OFDM waveform, or any combination thereof.

After detecting SSB 220 based on a PSS, UE 215 may determine a waveform type used for the SSS. In some examples, UE 215 similarly determines the waveform type for the SSS based on a carrier frequency used for SSB 220. In some examples, UE 215 determines the waveform type for the SSS based on determining the waveform type of the PSS—e.g., if the PSS is determined as using a single carrier waveform type, the SSS may be determined as using an OFDM waveform type. In some examples, UE 215 determines the waveform type for the SSS based on information included in the PSS—e.g., a time-domain sequence used for the PSS may also convey a waveform type for the SSS.

UE 215 may determine a waveform type used for the PBCH transmission. In some examples, UE 215 may determine the waveform type used for the PBCH transmission based on the PSS. In some examples, UE 215 similarly determines the waveform type for the PBCH transmission based on a carrier frequency used for SSB 220. In some examples, UE 215 determines the waveform type for the PBCH transmission based on determining the waveform type of the PSS—e.g., if the PSS is determined as using a single carrier waveform type, the PBCH transmission may be determined as using an SC-FDM waveform type. In some examples, UE 215 determines the waveform type for the PBCH transmission based on information included in the PSS—e.g., a time-domain sequence used for the PSS may also convey a waveform type for the PBCH transmission.

In some examples, UE 215 may determine the waveform type used for the PBCH transmission based on the SSS, or a combination of the PSS and SSS. In some examples, UE 215 determines the waveform type for the PBCH transmission based on determining the waveform type of the SSS—e.g., if the SSS is determined as using an OFDM waveform type, the PBCH transmission may be determined as using an SC-FDM waveform type. In some examples, UE 215 determines the waveform type for the PBCH transmission based on information included in the SSS—e.g., if a single carrier waveform is used for the SSS, a time-domain sequence used for the SSS may also convey a waveform type for the PBCH transmission. In some examples, UE 215 determines the waveform type for the PBCH transmission based on an order of PSS and SSS within SSB 220—e.g., if the SSS occurs before the PSS, the PBCH transmission may be determined as using an SC-FDM waveform type.

After determining the waveform types of the different transmissions in SSB 220, UE 215 may obtain information (e.g., timing, frequency, and system information) from SSB 220. In some examples, UE 215 may initiate a random access channel (RACH) procedure to gain access to a radio access network based on SSB 220. As part of the RACH procedure, UE 215 may transmit RACH message 230 to base station 205 via uplink 235 based on SSB 220.

Figure 3:
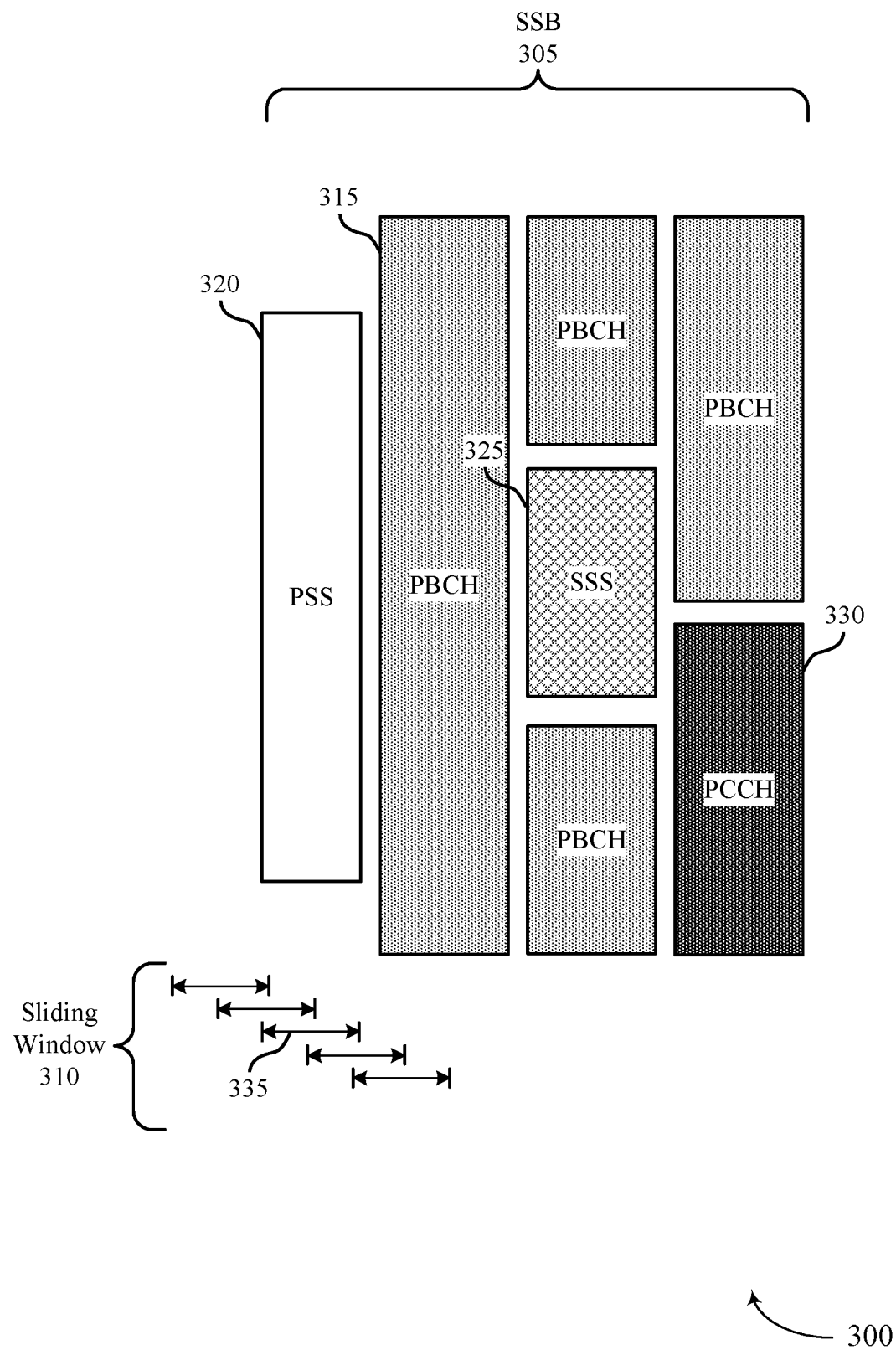
FIG. 3 illustrates an example of a resource configuration that supports mixed-waveform communications in accordance with aspects of the present disclosure.

FIG. 3 illustrates an example of a resource configuration that supports mixed-waveform communications in accordance with aspects of the present disclosure. Resource configuration 300 depicts an SSB that includes a first portion, a second portion, a third portion, and, in some examples, a fourth portion. The first portion of SSB 305 may include PSS 320, the second portion of SSB 305 may include SSS 325, and the third portion of SSB 305 may include PBCH transmissions, including PBCH transmission 315. The fourth portion of SSB 305 may include physical control channel (PCCH) transmission 330, which may be frequency multiplexed with a PBCH transmission.

In some examples, PSS 320 may be generated in accordance with a single carrier waveform type, and thus, may be spread across a frequency range. PSS 320 may also include a time-domain sequence (e.g., that includes 127 samples) that may be used by a UE to determine timing and frequency information for a cell over which SSB 305 is transmitted. In other examples, PSS 320 may be generated in accordance with an OFDM waveform type and include a frequency-domain sequence (e.g., a 127 length m-sequence) that may be used by a UE to determine the timing and frequency information. When generated using an OFDM waveform type, PSS 320 may be frequency-division multiplexed with other transmissions (e.g., with one or more PCCH transmissions).

In some examples, SSS 325 may be generated in accordance with a single carrier waveform type, and thus, may be spread across a frequency range. SSS 325 may also include a time-domain sequence (e.g., that includes 127 samples) and may be used by a UE to determine additional timing and frequency information as well as system information for the cell (e.g., a cell ID). When a single carrier waveform type is used for SSS 325, SSS 325 may not be multiplexed with other transmissions (or may be multiplexed with fewer transmissions). In other examples, SSS 325 may be generated in accordance with a frequency-domain sequence (e.g., a 127 length Gold sequence) that may be used by the UE to determine the additional timing information and/or system information. In some examples, SSS 325 may occur before PSS 320 in time. When generated using an OFDM waveform type, SSS 325 may be frequency-division multiplexed with other transmissions (e.g., with one or more PCCH transmissions).

In some examples, PBCH transmission 315 (and, in some examples, the other PBCH transmissions) may be generated in accordance with an SC-FDM waveform type (e.g., DFT-s-OFDM). In other examples, PBCH transmission 315 (and, in some examples, the other PBCH transmissions) may be generated in accordance with an OFDM waveform type. In other examples, PBCH transmission 315 (and, in some examples, the other PBCH transmissions) may be generated in accordance with a single carrier waveform type. PBCH transmission 315 may include system information (e.g., a bandwidth of the cell, a system frame number, physical hybrid automatic repeat request indicator channel (PHICH) information, etc.). When generated using an SC-FDM or OFDM waveform type, PBCH transmissions may be multiplexed with other transmissions, such as PCCH transmission 330.

PCCH transmission 330 may include control information (e.g., a CORESET) and may be generated using an SC-FDM or OFDM waveform type. In some examples, the PBCH transmissions and PCCH transmission 330 use a same modulation technique (e.g., an SC-FDM modulation with QPSK). In some examples, a transmitting device (e.g., a base station) uses a single DFT to transform frequency-division multiplexed PBCH data and PCCH data before mapping the data to a set of subcarriers—e.g., to reduce a PAPR of the combined transmissions. In other examples, a transmitting device (e.g., a base station) uses multiple DFTs to transform frequency-division multiplexed PBCH and PCCH data before mapping the data to a set of subcarriers—e.g., to enable separate DMRS and additional flexibility. In some examples, when multiple DFTs are used, more resource blocks are allocated to PCCH transmission 330 than the multiplexed PBCH transmission—e.g., to reduce a PAPR of the combined transmissions.

Resource configuration 300 also depicts sliding window 310 used by a UE to detect a PSS. Sliding window 310 may have a duration that is equal (or close) to a duration of PSS 320 and may shift in time, resulting in overlapping detection windows. For each detection window, the UE may compare signals received during the detection window with a set of sequences that may be used for a PSS. In some example, the set of sequences include sequences associated with a first waveform type that may be used for a PSS, sequences associated with a second waveform type that may be used for a PSS, and so on. The UE may also apply frequency shifts to each of the sequences (or received signals) and compare the adjusted sequences against the received signals (or original sequences) to compensate for frequency errors that may occur. In some examples, the UE may determine a waveform for PSS 320, as described herein and with reference to FIG. 2 (e.g., based on a carrier frequency of SSB 305). In some examples, the UE may detect PSS 320 during window 335.

After detecting PSS 320, the UE may determine timing and/or frequency information for communications over the cell. The UE may also identify SSS 325 based on detecting PSS 320 and determining the timing information. In some examples, the UE may determine a waveform type for SSS 325, as described herein and with reference to FIG. 2 (e.g., based on a carrier frequency of SSB 305 or based on PSS 320). After identifying SSS 325, the UE may obtain additional timing, frequency, and/or information about the cell (e.g., a cell ID) and may identify the PBCH transmission (including PBCH transmission 315). In some examples, the UE may determine a waveform type for the PBCH transmissions, as described herein and with reference to FIG. 2 (e.g., based on a carrier frequency of SSB 305, PSS 320, or SSS 325). After identifying the PBCH transmissions, the UE may decode the PBCH transmission to obtain additional system information for the cell.

In some examples, SSB 305 includes a first portion and a second portion. In some examples, the first portion includes a PSS and the second portion includes an SSS. In some examples, the first portion includes a PSS and the second portion includes a PBCH transmission. In some examples, the first portion includes an SSS and the second portion includes a PBCH transmission. Among other possible combinations. When SSB 305 includes two portions, SSB 305 may similarly use different waveform types for the different portions—e.g., based on timing resolution, frequency resolution, processing load considerations, PAPR considerations, frequency division multiplexing capabilities, or any combination thereof. In some examples, a single carrier waveform type is used for the first portion and an OFDM waveform type is used for the second portion. In some examples, a single carrier waveform type is used for the first portion and an SC-FDM waveform type is used for the second portion. In some examples, an OFDM waveform type is used for the first portion and a single carrier waveform type is used for the second portion. Among other possible combinations.

Figure 4:
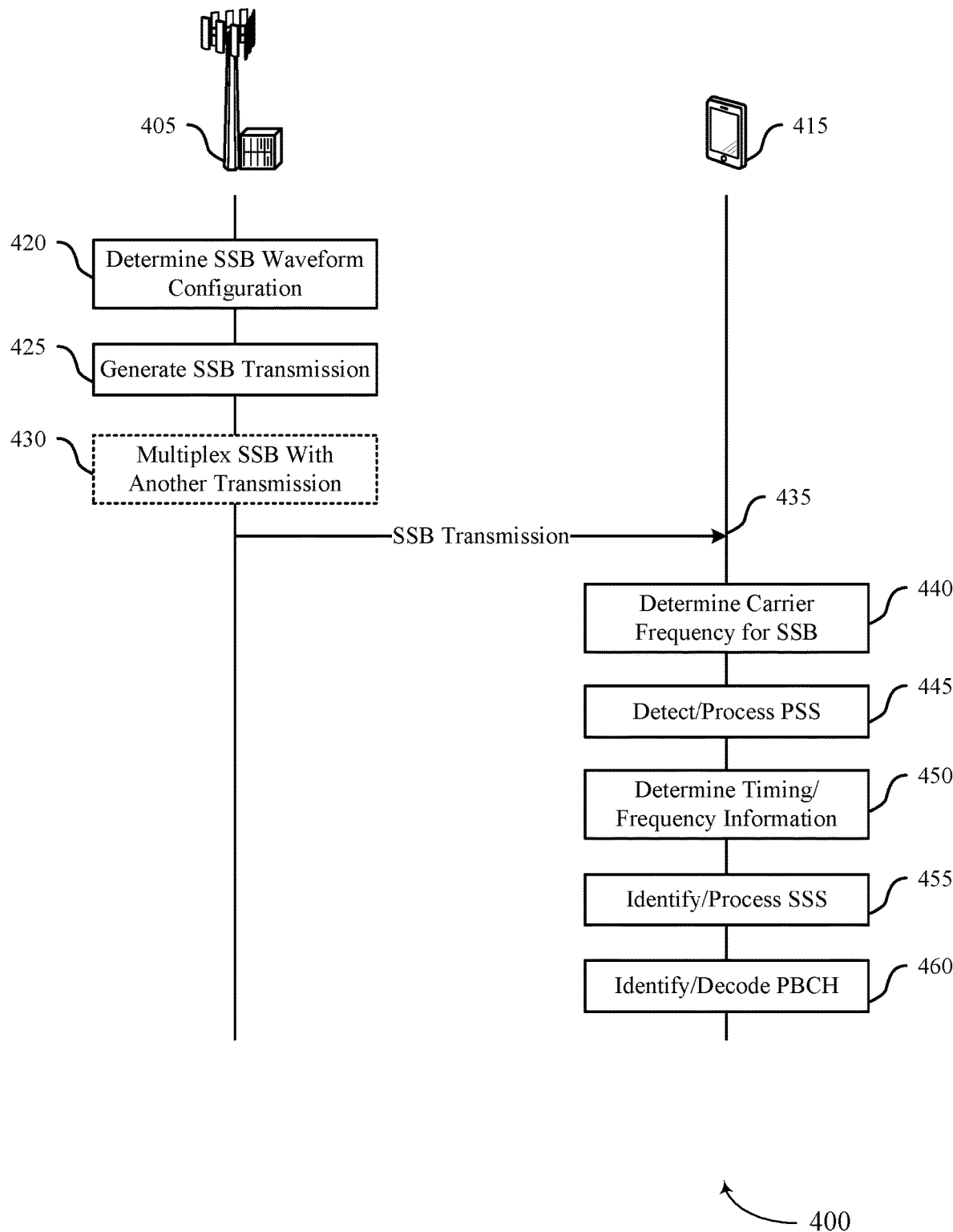
FIG. 4 illustrates an example of a process flow that supports mixed-waveform communications in accordance with aspects of the present disclosure.

FIG. 4 illustrates an example of a process flow that supports mixed-waveform communications in accordance with aspects of the present disclosure. Process flow 400 may be performed by base station 405 and UE 415, which may be examples of a base station or UE described above with reference to FIGS. 1 and 2. In some examples, process flow 400 illustrates an exemplary sequence of operations performed to support multi-waveform communications. For example, process flow 400 depicts operations for selecting a combination of waveform types to use for an SSB and determining the combination of waveform types used for an SSB.

It is understood that one or more of the operations described in process flow 400 may be performed earlier or later in the process, omitted, replaced, supplemented, or performed in combination with another operation. Also, additional operations described herein that are not included in process flow 400 may be included.

At block 420, base station 405 may determine a waveform configuration to use for an SSB transmission. In some examples, the waveform configuration is determined based on a preconfigured mapping. In some cases, the mapping may indicate which waveforms to use for which portions of an SSB based on a frequency range associated with the SSB transmission. In some cases, the mapping may indicate a waveform to use for a first portion of the SSB (e.g., for a PSS) based on the frequency range, and the base station may determine which waveforms to use for the remaining portions of the SSB—e.g., based on timing and frequency resolution parameters, processing load parameters, PAPR considerations, channel quality considerations, throughput considerations, or any combination thereof.

In some examples, the waveform configuration is determined based on timing and frequency resolution parameters, processing load parameters, PAPR considerations, channel quality considerations, throughput considerations, or any combination thereof. For example, base station 405 may select a waveform for a PSS that decreases a processing load at a UE associated with detecting the PSS while achieving a sufficient timing resolution to receive subsequent control and/or data symbols—e.g., when a channel quality is above a threshold. In other examples, base station 405 may select a waveform for a PSS that increases a processing load at a UE associated with detecting the PSS while increasing a timing resolution and SNR associated with the PSS—e.g., when a channel quality is below a threshold. In some examples, base station 405 may select waveforms for an SSB that efficiently support frequency division multiplexing (e.g., OFDM or SC-FDM waveforms) to increase a throughput of communications, while also increasing a processing load at a UE. In some examples, base station 405 may select waveforms that decrease a PAPR of SSB transmissions (e.g., single carrier or SC-FDM waveforms) to avoid operating a power amplifier at base station 405 in a non-linear region.

In some examples, base station 405 selects a waveform configuration for an SSB that is to be transmitted in a high frequency band (e.g., a sub-Terahertz band) that includes a single carrier waveform for a PSS, an OFDM waveform for an SSS, and an SC-FDM waveform (e.g., DFT-s-OFDM) for a PBCH.

At block 425, base station 405 may generate an SSB transmission based on the determine SSB waveform configurations. For example, base station 405 may generate a PSS transmission in accordance with a single carrier waveform, where the PSS transmission may include a time-domain sequence (e.g., that includes 127 samples). An SSS transmission in accordance with an OFDM waveform, where the SSS transmission may include a frequency-domain sequence (e.g., a Gold sequence of length 127). And one or more PBCH transmission in accordance with an SC-FDM waveform (e.g., a DFT-s-OFDM waveform). In some examples, a subset of the one or more PBCH transmissions may be frequency-division multiplexed with the SSS transmission. In some examples, base station 405 may generate the SSB transmission such that the SSS transmission occurs before the PSS transmission in time.

At block 430, base station 405 may multiplex one or more portions of the SSB transmission with other transmissions. In some examples, base station 405 may multiplex the portions of the SSB transmission that use waveforms that support efficient frequency-division multiplexing (e.g., OFDM and SC-FDM waveforms) with the other transmissions. In some examples, the other transmissions may be control channel transmissions, which may include CORE-SETs.

At arrow 435, base station 405 may transmit the SSB transmission (and any multiplexed transmissions) to UE 415. The SSB transmission may include a PSS, SSS, and PBCH transmissions, where the PSS, SSS, and PBCH transmission may use the waveform types determined by base station 405.

At block 440, UE 415 may determine one or more carrier frequencies associated with detecting SSB transmissions. In some examples, the determined one or more carrier frequencies are based on one or more frequency ranges supported by UE 415.

At block 445, UE 415 may perform operations for detecting a PSS included in an SSB. In some examples, UE 415 may blindly search for the PSS in a frequency range that is associated with a determined carrier frequency. That is, UE 415 may compare signals received during discrete intervals of a sliding window with a set of sequences that may be used for a PSS. In some examples, UE 415 may compare the signals against frequency shifted versions of the set of sequences based on frequency errors that may occur during transmission of the SSB. In some examples, UE 415 may compare the signals against different sets of sequences that are associated with different waveform types being used for the PSS (while also considering frequency shifts). For example, UE 415 may compare the signals against a first set of sequences associated with a first waveform type (e.g., a set of time-domain sequences associated with a single carrier waveform) and a second set of sequences associated with a second waveform type (e.g., a set of frequency-domain sequences associated with an OFDM or SC-OFDM waveform).

In some examples, UE 415 may perform a semi-blind search for the PSS. That is, UE 415 may determine the waveform type used for the PSS before performing the detection process. For example, UE 415 may determine that the waveform type used for the PSS is a single carrier waveform based on searching for the SSB in a high frequency band (e.g., a sub-Terahertz band). Or UE 415 may determine that the waveform type used for the PSS is an OFDM waveform based on searching for the SSB in a lower frequency band (e.g., a millimeter wave band). Thus, UE 415 may compare the receive signals against a set of sequences associated with the determined waveform type and considering frequency shifts that may occur during transmission. In some examples, UE 415 may detect a PSS of an SSB based on the detection procedure.

At block 450, UE 415 may determine timing and/or frequency information about a cell over which the SSB was transmitted based on detecting the PSS. In some examples, the resolution of the timing and/or frequency information is sufficient to receive and decode subsequently transmitted control and/or data symbols—e.g., in high frequency bands.

At block 455, UE 415 may identify an SSS included in the SSB based on the timing and/or frequency information obtained from the PSS. In some examples, the SSB may identify a beginning and end of the SSS based on a predetermined duration between the PSS and SSS and the timing information. In some examples, the SSS occurs before the PSS in time. UE 415 may also determine a waveform type of the SSS to enable reception and decoding of the SSS.

In some examples, UE 415 determines the waveform type of the SSS based on a carrier frequency associated with the SSB—e.g., UE 415 may determine that an OFDM waveform type is used for the SSS based on searching for the SSB in a high frequency band. In some examples, UE 415 determines the waveform type of the SSS based on a waveform type determined for the PSS—e.g., UE 415 may determine that a single carrier waveform type is used for the SSS based on determining that a single carrier waveform type is used for the PSS. In some examples, UE 415 determines the waveform type of the SSS based on information indicated by a sequence used for the PSS—e.g., a time-domain sequence of the PSS may indicate that an OFDM waveform type is used for the SSS. After identifying and determining a waveform type of the SSS, UE 415 may process the SSS. In some examples, UE 415 may determine additional timing and/or frequency information for the cell as well as system information for the cell, such as a cell identity.

At block 460, UE 415 may identify one or more PBCH transmissions included in the SSB based on the timing and/or frequency information obtained from the PSS and/or SSS. In some examples, UE 415 may determine a waveform type of the one or more PBCH transmissions based on a carrier frequency associated with the SSB—e.g., UE 415 may determine that an SC-FDM waveform type is used for the one or more PBCH transmissions based on searching for the SSB in a high frequency band. In some examples, UE 415 determines the waveform type of the one or more PBCH transmissions based on a waveform type determined for the PSS—e.g., UE 415 may determine that an SC-FDM waveform type is used for the one or more PBCH transmissions based on determining that a single carrier waveform type is used for the PSS. In some examples, UE 415 determines the waveform type of the one or more PBCH transmissions based on information indicated by a sequence used for the PSS—e.g., a time-domain sequence of the PSS may indicate that an SC-FDM waveform type is used for the one or more PBCH transmissions.

In some examples, UE 415 determines the waveform type of the one or more PBCH transmissions based on a waveform type determined for the SSS—e.g., UE 415 may determine that an SC-FDM waveform type is used for the one or more PBCH transmissions based on determining that a single carrier waveform type is used for the SSS. In some examples, UE 415 determines the waveform type of the one or more PBCH transmissions based on information indicated by a sequence used for the SSS—e.g., a time-domain sequence of the SSS may indicate that an SC-FDM waveform type is used for the one or more PBCH transmissions. In some examples, a combined indication included in a sequence of the PSS and a sequence of the SSS may indicate a waveform type of the one or more PBCH transmissions.

In some examples, UE 415 determines the waveform type of the one or more PBCH transmission based on an order of the PSS and SSS in time. For example, UE 415 may determine that an SC-FDM waveform type is used for the one or more PBCH transmissions if the SSS occurs before the PSS in time.

Figure 5:
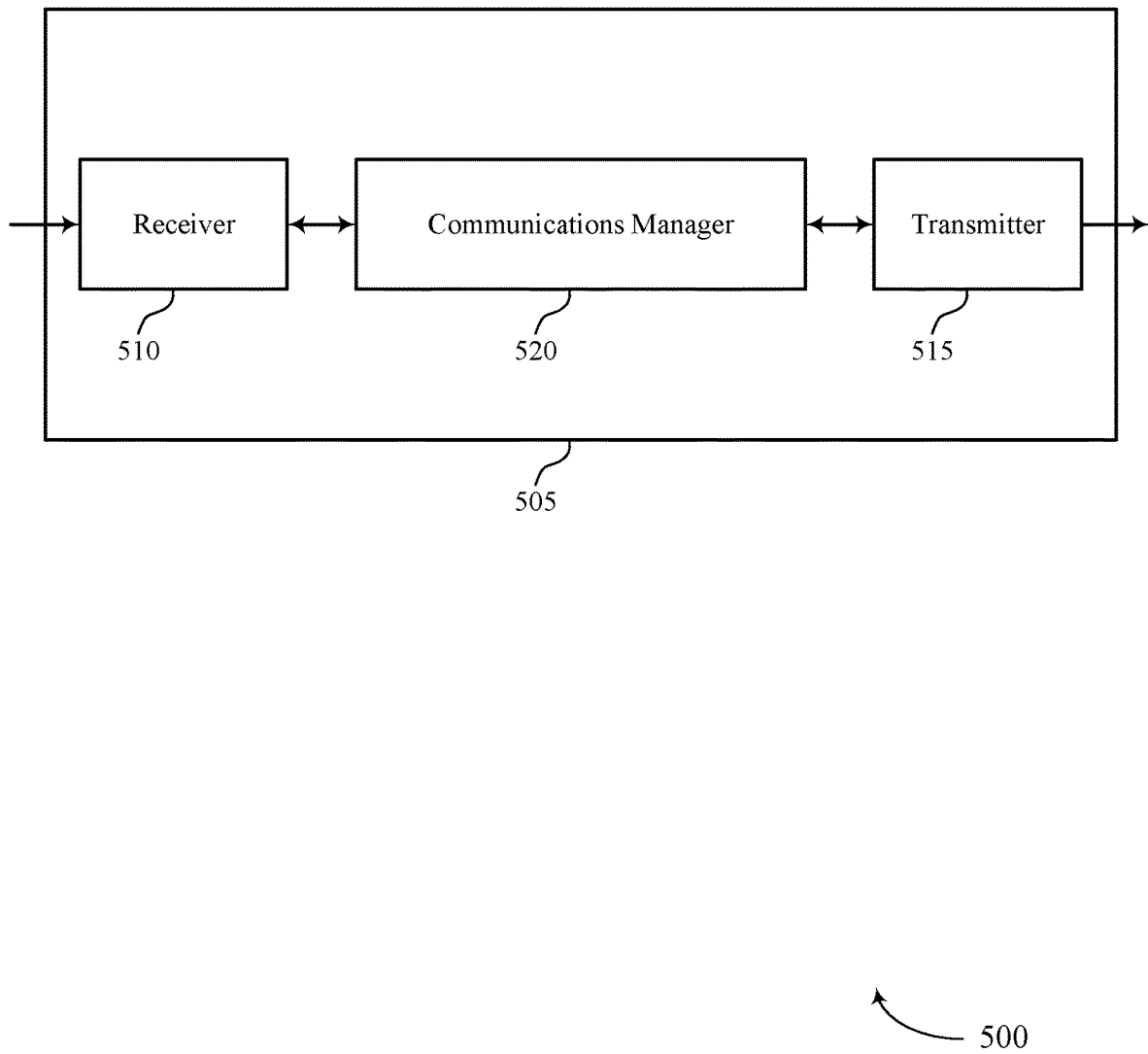
FIGS. 5 and 6 show block diagrams of devices that support mixed-waveform communications in accordance with aspects of the present disclosure.

FIG. 5 shows a block diagram 500 of a device 505 that supports mixed-waveform communications in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to mixed-waveform communications). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to mixed-waveform communications). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of mixed-waveform communications as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. For example, the communications manager 520 may be configured as or otherwise support a means for monitoring for a transmission of a synchronization signal block that includes a first portion generated in accordance with a first waveform type and a second portion generated in accordance with a second waveform type that is different than the first waveform type. The communications manager 520 may be configured as or otherwise support a means for detecting, based at least in part on the monitoring, the first portion based on the first waveform type. The communications manager 520 may be configured as or otherwise support a means for processing, based on the detecting, the second portion based on information obtained from the first portion.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for increasing a timing and/or frequency resolution obtained from an SSB while reducing a processing complexity associated with detecting an SSB by using different waveform types for different portions of the SSB.

Figure 6:
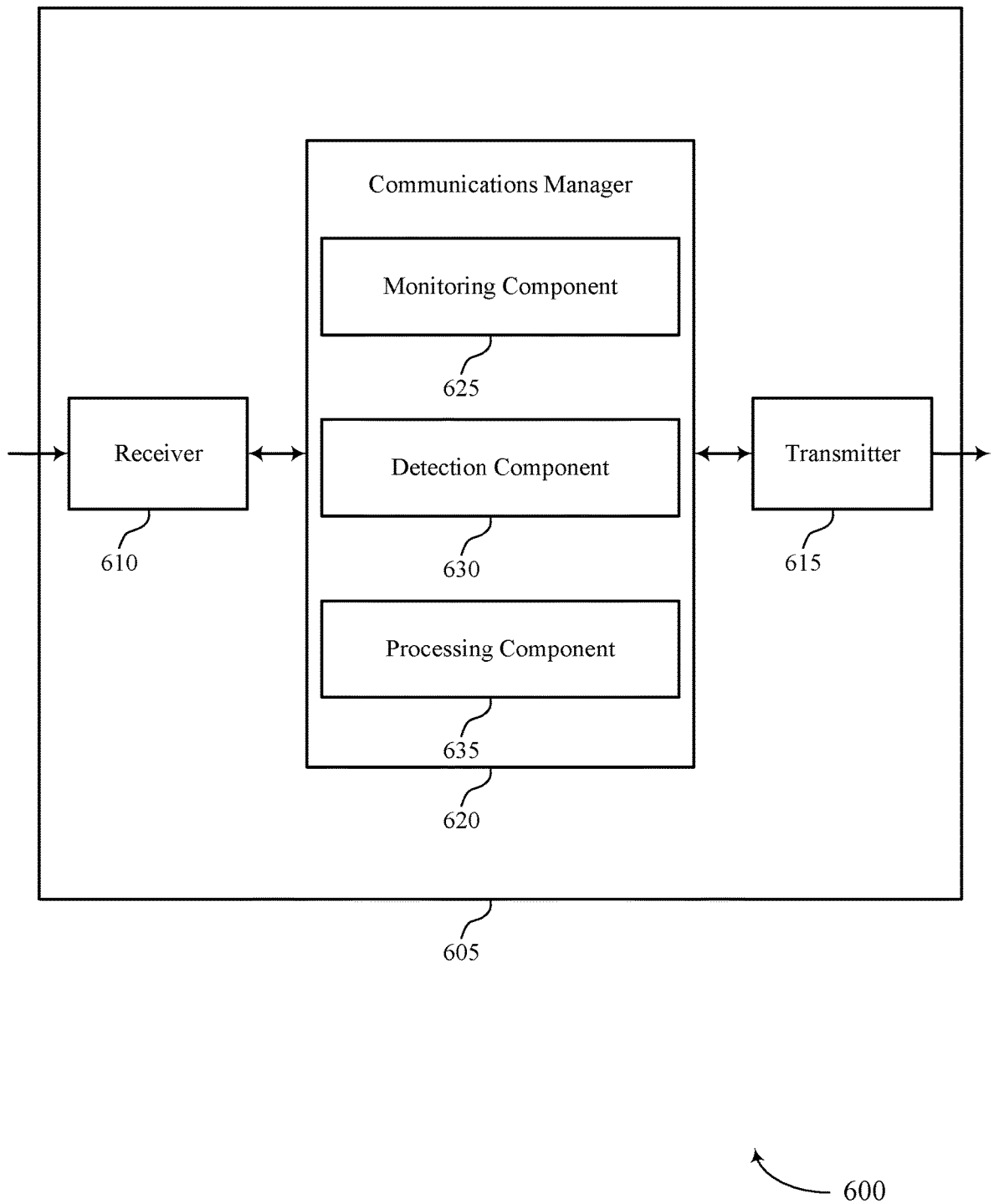

FIG. 6 shows a block diagram 600 of a device 605 that supports mixed-waveform communications in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to mixed-waveform communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to mixed-waveform communications). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of mixed-waveform communications as described herein. For example, the communications manager 620 may include a monitoring component 625, a detection component 630, a processing component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. The monitoring component 625 may be configured as or otherwise support a means for monitoring for a transmission of a synchronization signal block that includes a first portion generated in accordance with a first waveform type and a second portion generated in accordance with a second waveform type that is different than the first waveform type. The detection component 630 may be configured as or otherwise support a means for detecting, based on the monitoring, the first portion based on the first waveform type. The processing component 635 may be configured as or otherwise support a means for processing, based on the detecting, the second portion based on information obtained from the first portion.

Figure 7:
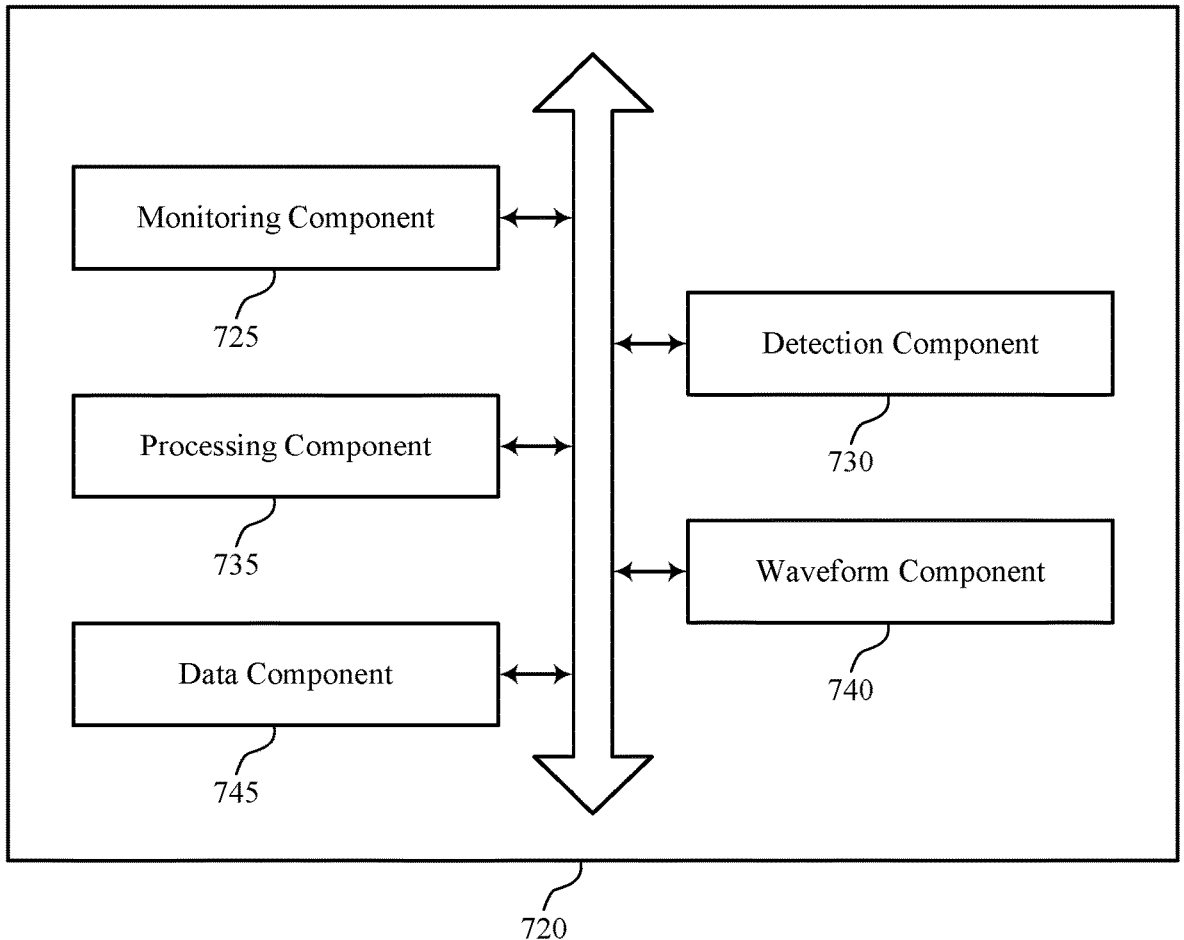
FIG. 7 shows a block diagram of a communications manager that supports mixed-waveform communications in accordance with aspects of the present disclosure.

FIG. 7 shows a block diagram 700 of a communications manager 720 that supports mixed-waveform communications in accordance with aspects of the present disclosure.

The communications manager 720 may be an example of aspects of a communications manager 520, a communications manager 620, or both, as described herein. The communications manager 720, or various components thereof, may be an example of means for performing various aspects of mixed-waveform communications as described herein. For example, the communications manager 720 may include a monitoring component 725, a detection component 730, a processing component 735, a waveform component 740, a data component 745, or any combination thereof. Each of these components may communicate, directly or indirectly, with one another (e.g., via one or more buses).

The communications manager 720 may support wireless communication at a UE in accordance with examples as disclosed herein. The monitoring component 725 may be configured as or otherwise support a means for monitoring for a transmission of a synchronization signal block that includes a first portion generated in accordance with a first waveform type and a second portion generated in accordance with a second waveform type that is different than the first waveform type. The detection component 730 may be configured as or otherwise support a means for detecting, based on the monitoring, the first portion based on the first waveform type. The processing component 735 may be configured as or otherwise support a means for processing, based on the detecting, the second portion based on information obtained from the first portion.

In some examples, the waveform component 740 may be configured as or otherwise support a means for determining the first waveform type for the first portion based on a configuration of the UE, a frequency of the transmission of the synchronization signal block, or both.

In some examples, the waveform component 740 may be configured as or otherwise support a means for determining the second waveform type for the second portion based on determining the first waveform type for the first portion, an indication of the second waveform type included in the first portion, the configuration of the UE, the frequency of the transmission of the synchronization signal block, or any combination thereof.

In some examples, to support monitoring for the transmission, the detection component 730 may be configured as or otherwise support a means for testing, for each time window of a set of multiple time windows, a set of multiple hypotheses associated with detecting the first portion of the synchronization signal block, the set of multiple hypotheses including a set of multiple sequences, a set of multiple frequencies, a set of multiple waveform types, or any combination thereof.

In some examples, the processing component 735 may be configured as or otherwise support a means for determining first timing information based on the first portion of the synchronization signal block, where the first timing information supports a first timing resolution based on the first waveform type. In some examples, the data component 745 may be configured as or otherwise support a means for receiving, after processing the second portion and based on determining the first timing information, a data transmission including symbols having a duration, where the first timing resolution supports the duration of the symbols.

In some examples, a duration of the first portion is equivalent to a duration of each time window of the set of multiple time windows and greater than the duration of the symbols of the data transmission.

In some examples, the first waveform type is one of a single carrier waveform type, a single carrier-frequency division multiplexing type, or an orthogonal frequency division multiplexing type, and the second waveform type is one of the single carrier waveform type, the single carrier-frequency division multiplexing type, or the orthogonal frequency division multiplexing type.

In some examples, the synchronization signal block includes a third portion generated in accordance with a third waveform type, and the waveform component 740 may be configured as or otherwise support a means for determining the third waveform type for the third portion based on determining the first waveform type, determining the second waveform type, an indication of the first waveform type included in the first portion, an indication of the second waveform type included in the second portion, a configuration of the UE, a frequency of the transmission of the synchronization signal block, an order of the first portion relative to the second portion, or any combination thereof.

In some examples, to support None, the processing component 735 may be configured as or otherwise support a means for processing the third portion based on information obtained from the first portion.

In some examples, the first waveform type is one of a single carrier waveform type or an orthogonal frequency division multiplexing type, the second waveform type is one of the single carrier waveform type or the orthogonal frequency division multiplexing type, and the third waveform type is one of a single carrier-frequency division multiplexing type, the single carrier waveform type, or the orthogonal frequency division multiplexing type.

In some examples, the first waveform type is a single carrier waveform type, the second waveform type is an orthogonal frequency division multiplexing type, and the third waveform type is a single carrier-frequency division multiplexing type.

In some examples, the third portion of the synchronization signal block is transmitted using a first set of subcarriers and multiplexed with a second transmission that is transmitted using a second set of subcarriers.

Figure 8:
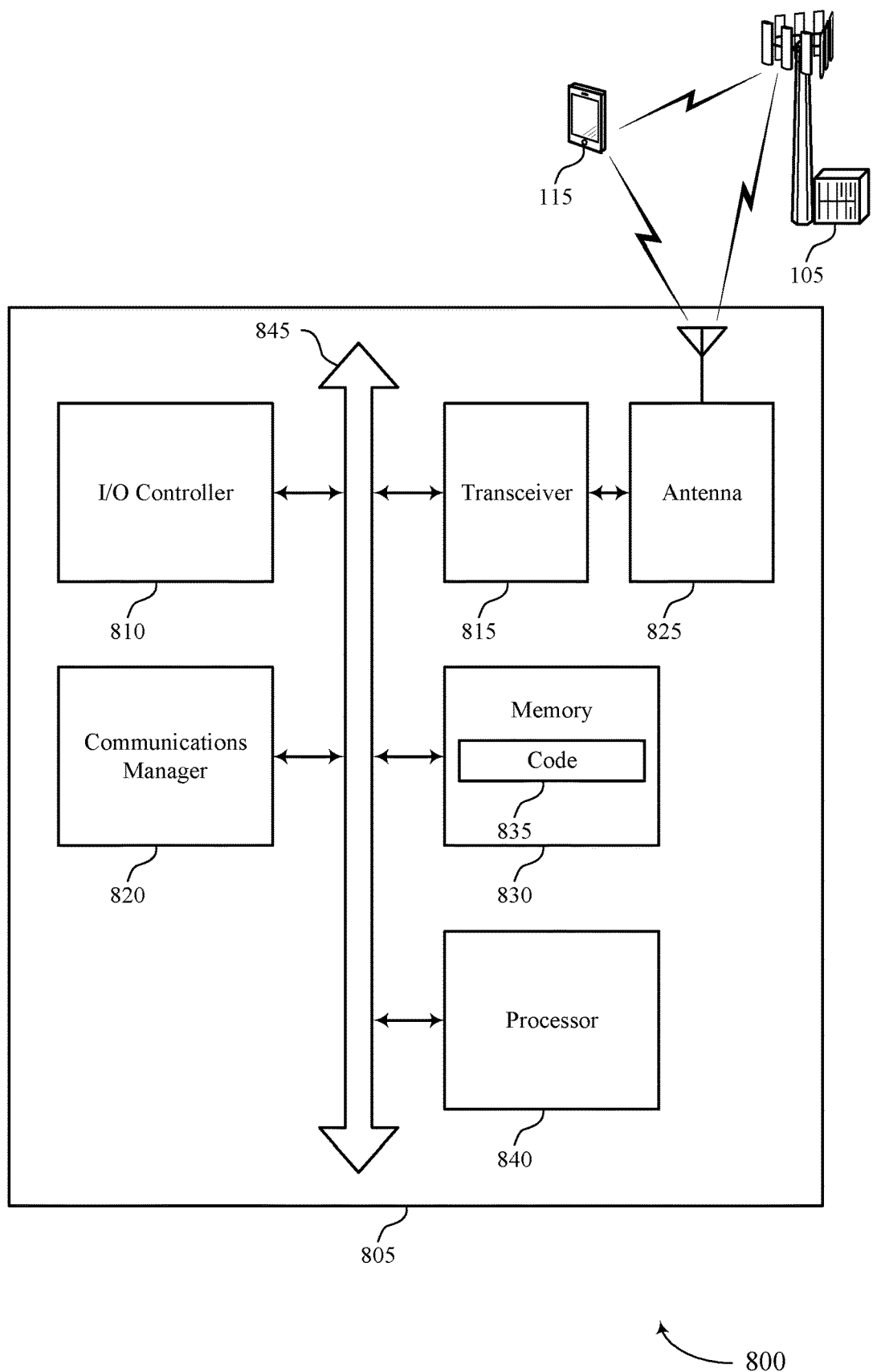
FIG. 8 shows a diagram of a system including a device that supports mixed-waveform communications in accordance with aspects of the present disclosure.

FIG. 8 shows a diagram of a system 800 including a device 805 that supports mixed-waveform communications in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting mixed-waveform communications). For example, the device 805 or a component of the device 805 may include a processor 840 and memory 830 coupled to the processor 840, the processor 840 and memory 830 configured to perform various functions described herein.

The communications manager 820 may support wireless communication at a UE in accordance with examples as disclosed herein. For example, the communications manager 820 may be configured as or otherwise support a means for monitoring for a transmission of a synchronization signal block that includes a first portion generated in accordance with a first waveform type and a second portion generated in accordance with a second waveform type that is different than the first waveform type. The communications manager 820 may be configured as or otherwise support a means for detecting, based at least in part on the monitoring, the first portion based on the first waveform type. The communications manager 820 may be configured as or otherwise support a means for processing, based on the detecting, the second portion based on information obtained from the first portion.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of mixed-waveform communications as described herein, or the processor 840 and the memory 830 may be otherwise configured to perform or support such operations.

Figure 9:
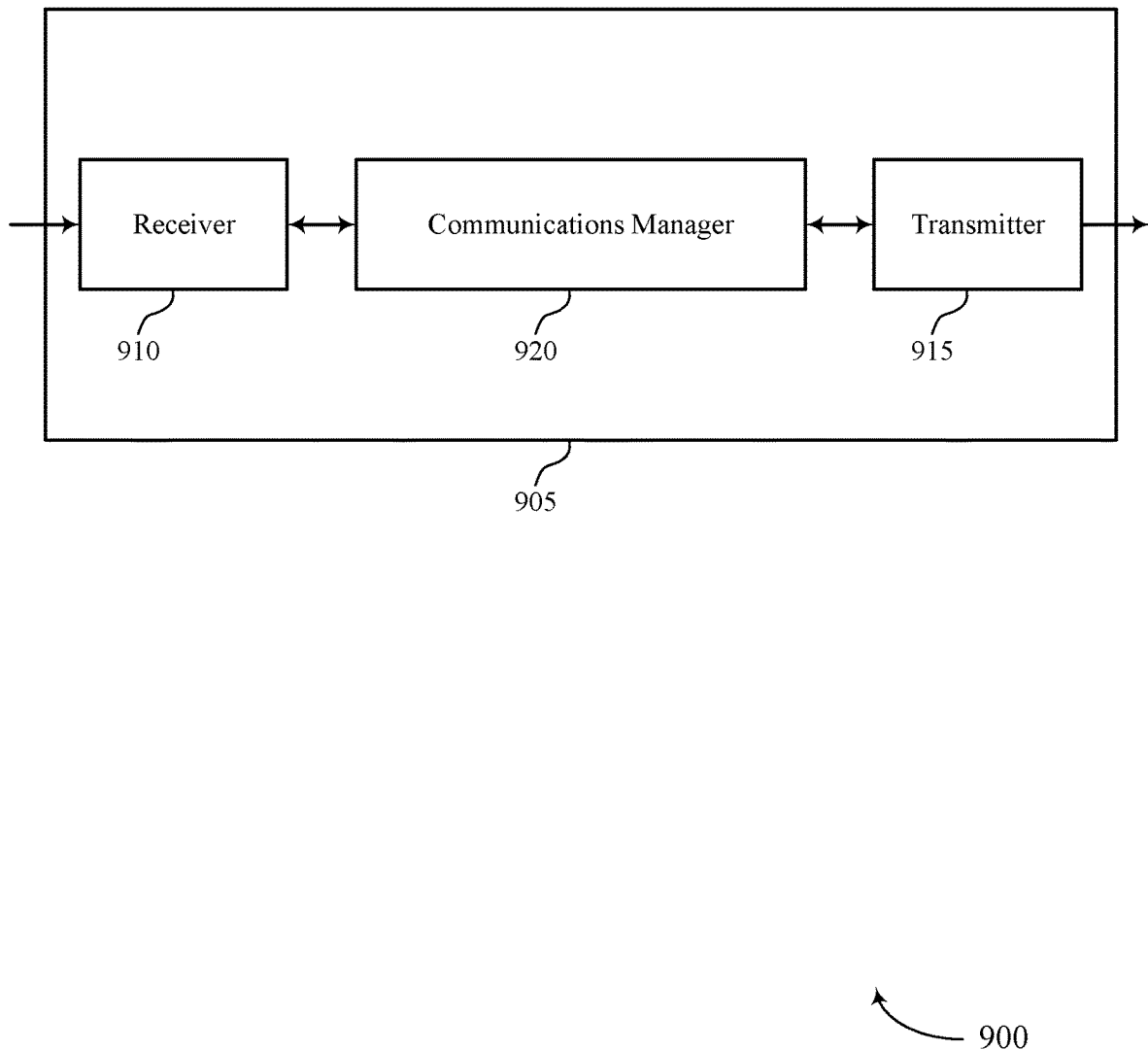
FIGS. 9 and 10 show block diagrams of devices that support mixed-waveform communications in accordance with aspects of the present disclosure.

FIG. 9 shows a block diagram 900 of a device 905 that supports mixed-waveform communications in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to mixed-waveform communications). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to mixed-waveform communications). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of mixed-waveform communications as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. For example, the communications manager 920 may be configured as or otherwise support a means for determining a first waveform type to use for a first portion of a synchronization signal block and a second waveform type to use for a second portion of the synchronization signal block, the second waveform type being different than the first waveform type. The communications manager 920 may be configured as or otherwise support a means for generating the first portion and the second portion of the synchronization signal block based on the determining. The communications manager 920 may be configured as or otherwise support a means for transmitting the synchronization signal block based on the generating.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for increasing a timing and/or frequency resolution obtained from an SSB while reducing a processing complexity associated with detecting an SSB by using different waveform types for different portions of the SSB.

Figure 10:
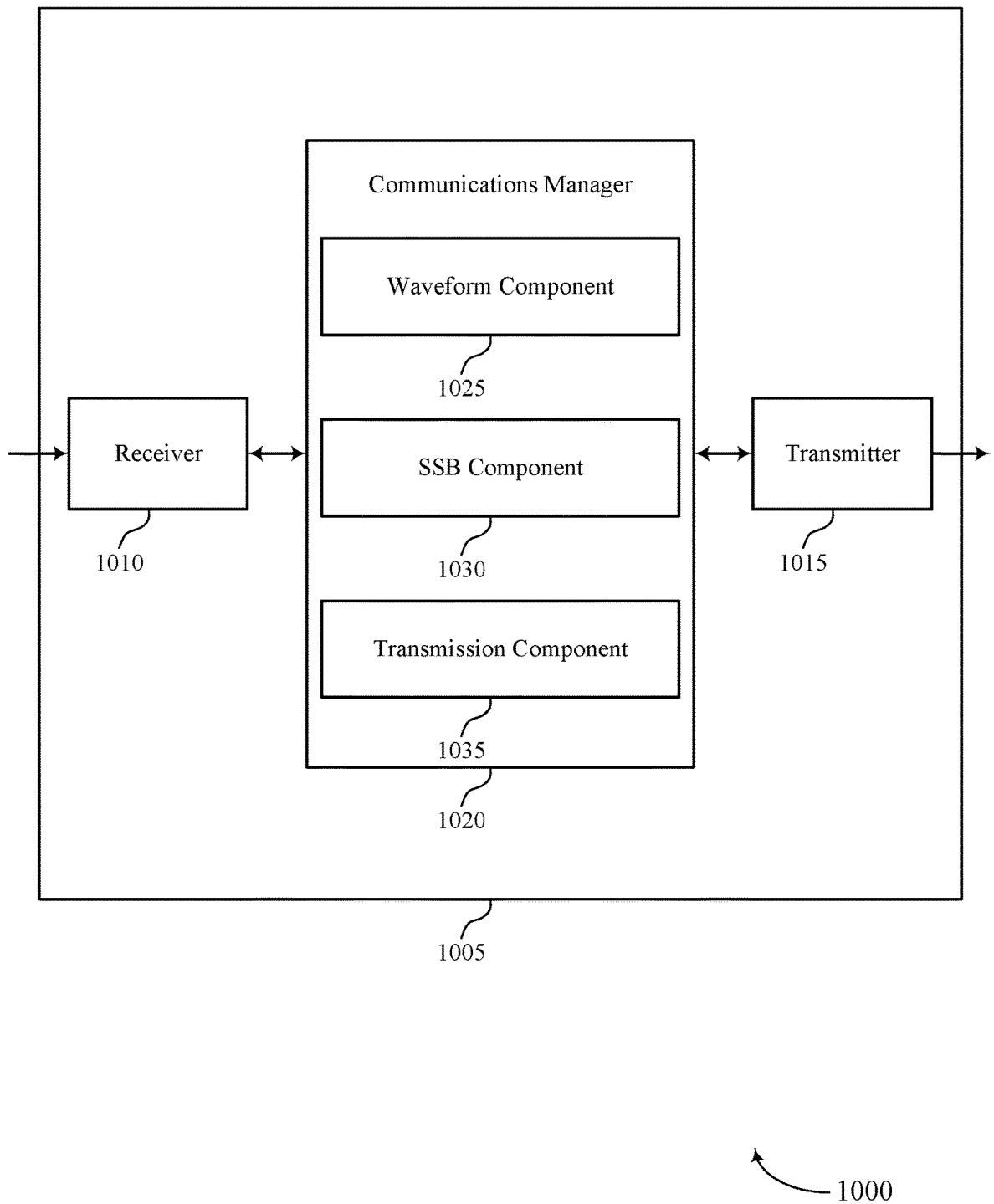

FIG. 10 shows a block diagram 1000 of a device 1005 that supports mixed-waveform communications in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to mixed-waveform communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to mixed-waveform communications). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of mixed-waveform communications as described herein. For example, the communications manager 1020 may include a waveform component 1025, an SSB component 1030, a transmission component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a base station in accordance with examples as disclosed herein. The waveform component 1025 may be configured as or otherwise support a means for determining a first waveform type to use for a first portion of a synchronization signal block and a second waveform type to use for a second portion of the synchronization signal block, the second waveform type being different than the first waveform type. The SSB component 1030 may be configured as or otherwise support a means for generating the first portion and the second portion of the synchronization signal block based on the determining. The transmission component 1035 may be configured as or otherwise support a means for transmitting the synchronization signal block based on the generating.

Figure 11:
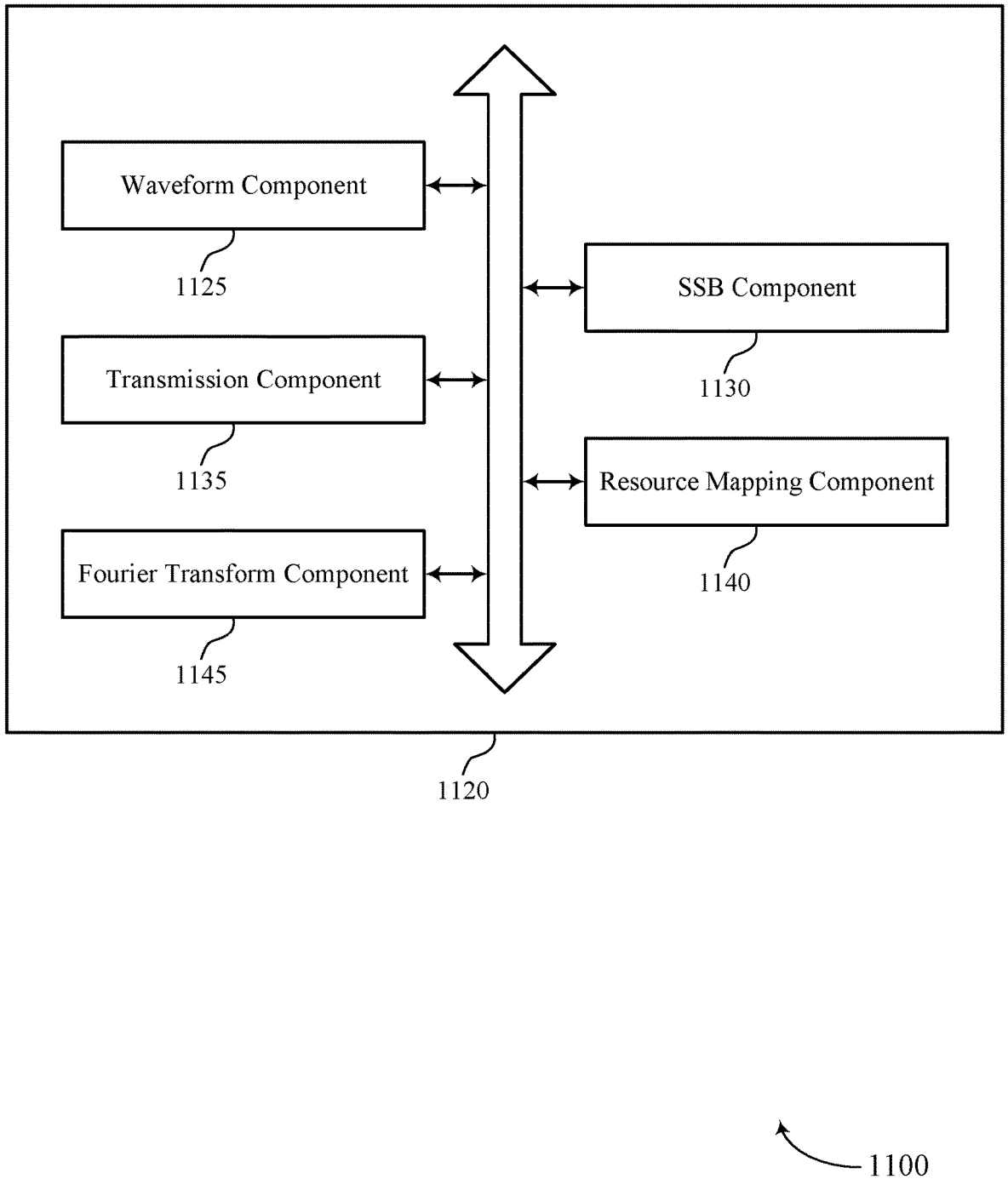
FIG. 11 shows a block diagram of a communications manager that supports mixed-waveform communications in accordance with aspects of the present disclosure.

FIG. 11 shows a block diagram 1100 of a communications manager 1120 that supports mixed-waveform communications in accordance with aspects of the present disclosure. The communications manager 1120 may be an example of aspects of a communications manager 920, a communications manager 1020, or both, as described herein. The communications manager 1120, or various components thereof, may be an example of means for performing various aspects of mixed-waveform communications as described herein. For example, the communications manager 1120 may include a waveform component 1125, an SSB component 1130, a transmission component 1135, a resource mapping component 1140, a Fourier transform component 1145, or any combination thereof. Each of these components may communicate, directly or indirectly, with one another (e.g., via one or more buses).

The communications manager 1120 may support wireless communication at a base station in accordance with examples as disclosed herein. The waveform component 1125 may be configured as or otherwise support a means for determining a first waveform type to use for a first portion of a synchronization signal block and a second waveform type to use for a second portion of the synchronization signal block, the second waveform type being different than the first waveform type. The SSB component 1130 may be configured as or otherwise support a means for generating the first portion and the second portion of the synchronization signal block based on the determining. The transmission component 1135 may be configured as or otherwise support a means for transmitting the synchronization signal block based on the generating.

In some examples, the transmission component 1135 may be configured as or otherwise support a means for transmitting a data transmission to a UE, where the first waveform type is determined based on a duration of symbols included in the data transmission, a duration of the synchronization signal block, power characteristics of the synchronization signal block, or any combination thereof.

In some examples, determining the first waveform type includes selecting the first waveform type based on a carrier frequency associated with transmitting the synchronization signal block. In some examples, determining the second waveform type includes selecting the second waveform type based on the carrier frequency associated with transmitting the synchronization signal block, or both.

In some examples, to support determining the first waveform type and the second waveform type, the waveform component 1125 may be configured as or otherwise support a means for selecting the first waveform type from one of a single carrier waveform type or an orthogonal frequency division multiplexing type. In some examples, to support determining the first waveform type and the second waveform type, the waveform component 1125 may be configured as or otherwise support a means for selecting, based on selecting the first waveform type, the second waveform type from one of the single carrier waveform type or the orthogonal frequency division multiplexing type.

In some examples, the waveform component 1125 may be configured as or otherwise support a means for selecting a single carrier waveform type for the first waveform type. In some examples, the SSB component 1130 may be configured as or otherwise support a means for where generating the synchronization signal block includes generating a time-domain sequence for the first portion based on selecting the single carrier waveform type.

In some examples, the time-domain sequence indicates the second waveform type used for the second portion of the synchronization signal block.

In some examples, to support determining the first waveform type and the second waveform type, the waveform component 1125 may be configured as or otherwise support a means for determining a third waveform type to use for a third portion of the synchronization signal block, where the third portion is associated with a physical broadcast channel.

In some examples, to support determining the third waveform type, the waveform component 1125 may be configured as or otherwise support a means for selecting the third waveform type from one of a single carrier-frequency division multiplexing type, a signal carrier type, or an orthogonal frequency division multiplexing type.

In some examples, the resource mapping component 1140 may be configured as or otherwise support a means for mapping the third portion of the synchronization signal block to a first subset of frequency resources. In some examples, the resource mapping component 1140 may be configured as or otherwise support a means for mapping a transmission associated with a different communication channel to a second subset of the frequency resources that is different than the first subset of the frequency resources.

In some examples, the Fourier transform component 1145 may be configured as or otherwise support a means for applying a discrete Fourier transform to a first set of symbols associated with the third portion and a second set of symbols associated with the different communication channel to obtain a set of frequency-domain symbols. In some examples, the resource mapping component 1140 may be configured as or otherwise support a means for where mapping the third portion of the synchronization signal block and the transmission associated with the different communication channel including mapping the set of frequency-domain symbols to the frequency resources.

In some examples, the Fourier transform component 1145 may be configured as or otherwise support a means for applying a first discrete Fourier transform to a first set of symbols associated with the third portion to obtain a first set of frequency-domain symbols. In some examples, the Fourier transform component 1145 may be configured as or otherwise support a means for applying a second discrete Fourier transform to a second set of symbols associated with the transmission associated with the different communication channel to obtain a second set of frequency-domain symbols. In some examples, the resource mapping component 1140 may be configured as or otherwise support a means for where mapping the third portion of the synchronization signal block and the transmission associated with the different communication channel including mapping the first set of frequency-domain symbols and the second set of frequency-domain symbols to the frequency resources.

In some examples, a quantity of the first set of frequency-domain symbols is less than a quantity of the second set of frequency-domain symbols.

Figure 12:
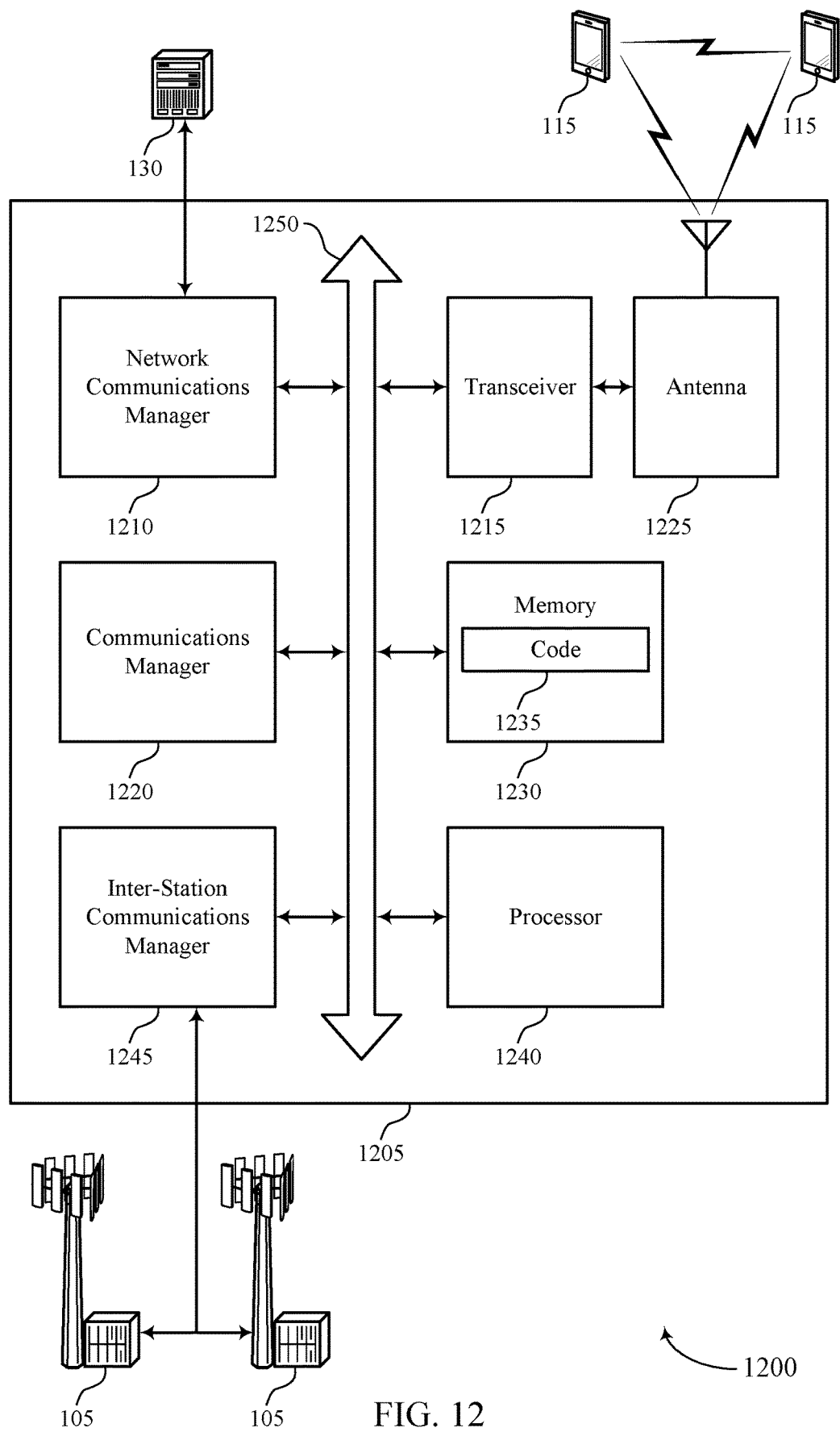
FIG. 12 shows a diagram of a system including a device that supports mixed-waveform communications in accordance with aspects of the present disclosure.

FIG. 12 shows a diagram of a system 1200 including a device 1205 that supports mixed-waveform communications in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting mixed-waveform communications). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communication at a base station in accordance with examples as disclosed herein. For example, the communications manager 1220 may be configured as or otherwise support a means for determining a first waveform type to use for a first portion of a synchronization signal block and a second waveform type to use for a second portion of the synchronization signal block, the second waveform type being different than the first waveform type. The communications manager 1220 may be configured as or otherwise support a means for generating the first portion and the second portion of the synchronization signal block based on the determining. The communications manager 1220 may be configured as or otherwise support a means for transmitting the synchronization signal block based on the generating.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of mixed-waveform communications as described herein, or the processor 1240 and the memory 1230 may be otherwise configured to perform or support such operations.

Figure 13:
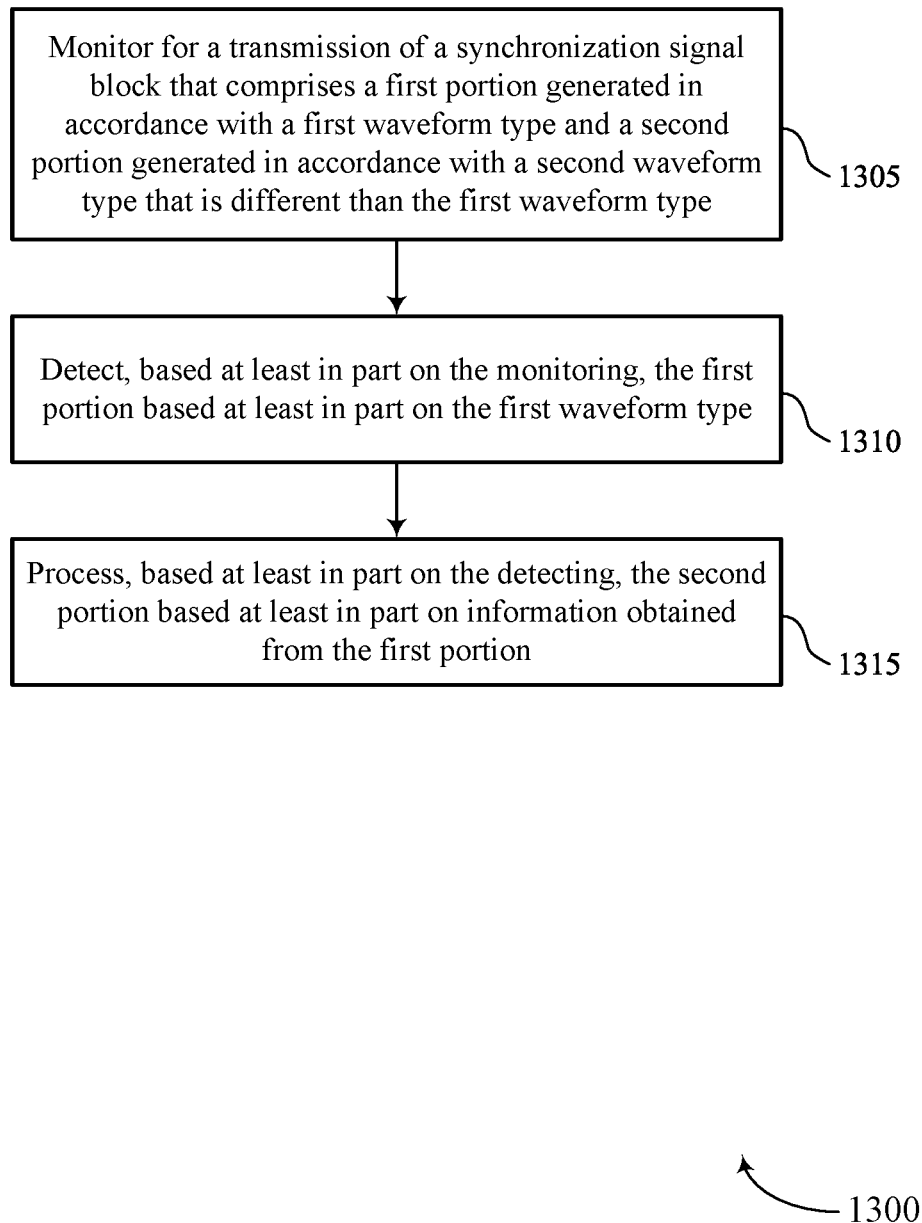
FIGS. 13 and 14 show flowcharts illustrating methods that support mixed-waveform communications in accordance with aspects of the present disclosure.

FIG. 13 shows a flowchart illustrating a method 1300 that supports mixed-waveform communications in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include monitoring for a transmission of a synchronization signal block that includes a first portion generated in accordance with a first waveform type and a second portion generated in accordance with a second waveform type that is different than the first waveform type. The operations of 1305 may be performed in accordance with examples as disclosed herein. In some examples, aspects of the operations of 1305 may be performed by a monitoring component 725 as described with reference to FIG. 7.

At 1310, the method may include detecting, based on the monitoring, the first portion based on the first waveform type. The operations of 1310 may be performed in accordance with examples as disclosed herein. In some examples, aspects of the operations of 1310 may be performed by a detection component 730 as described with reference to FIG. 7.

At 1315, the method may include processing, based on the detecting, the second portion based on information obtained from the first portion. The operations of 1315 may be performed in accordance with examples as disclosed herein. In some examples, aspects of the operations of 1315 may be performed by a processing component 735 as described with reference to FIG. 7.

Figure 14:
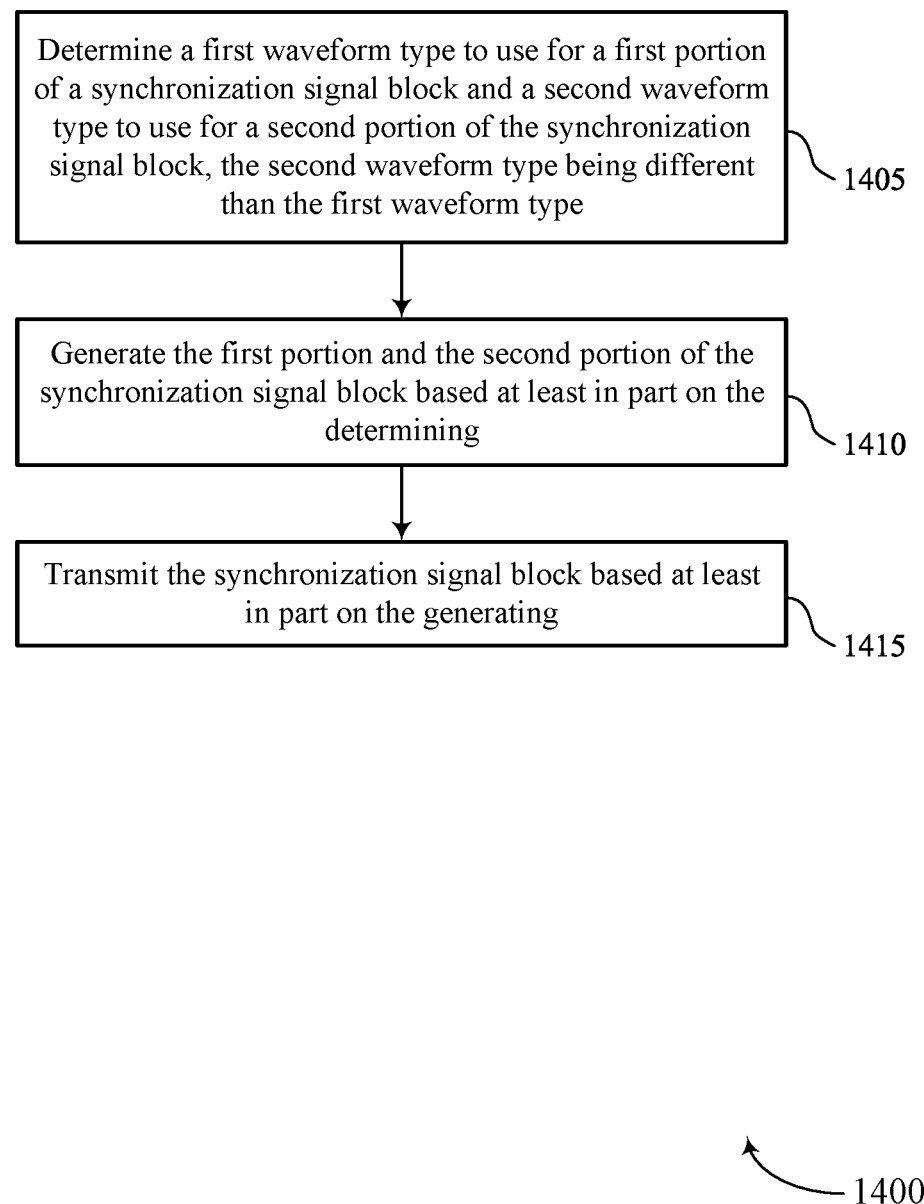

FIG. 14 shows a flowchart illustrating a method 1400 that supports mixed-waveform communications in accordance with aspects of the present disclosure. The operations of the method 1400 may be implemented by a base station or its components as described herein. For example, the operations of the method 1400 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1405, the method may include determining a first waveform type to use for a first portion of a synchronization signal block and a second waveform type to use for a second portion of the synchronization signal block, the second waveform type being different than the first waveform type. The operations of 1405 may be performed in accordance with examples as disclosed herein. In some examples, aspects of the operations of 1405 may be performed by a waveform component 1125 as described with reference to FIG. 11.

At 1410, the method may include generating the first portion and the second portion of the synchronization signal block based on the determining. The operations of 1410 may be performed in accordance with examples as disclosed herein. In some examples, aspects of the operations of 1410 may be performed by an SSB component 1130 as described with reference to FIG. 11.

At 1415, the method may include transmitting the synchronization signal block based on the generating. The operations of 1415 may be performed in accordance with examples as disclosed herein. In some examples, aspects of the operations of 1415 may be performed by a transmission component 1135 as described with reference to FIG. 11.

The following provides an overview of aspects of the present disclosure:

Aspect 1: A method for wireless communication at a UE, comprising: monitoring for a transmission of a synchronization signal block that comprises a first portion generated in accordance with a first waveform type and a second portion generated in accordance with a second waveform type that is different than the first waveform type; detecting, based at least in part on the monitoring, the first portion based at least in part on the first waveform type; and processing, based at least in part on the detecting, the second portion based at least in part on information obtained from the first portion.

Aspect 2: The method of aspect 1, further comprising: determining the first waveform type for the first portion based at least in part on a configuration of the UE, a frequency of the transmission of the synchronization signal block, or both.

Aspect 3: The method of aspect 2, further comprising: determining the second waveform type for the second portion based at least in part on determining the first waveform type for the first portion, an indication of the second waveform type included in the first portion, the configuration of the UE, the frequency of the transmission of the synchronization signal block, or any combination thereof.

Aspect 4: The method of any of aspects 1 through 3, wherein monitoring for the transmission comprises: testing, for each time window of a plurality of time windows, a plurality of hypotheses associated with detecting the first portion of the synchronization signal block, the plurality of hypotheses comprising a plurality of sequences, a plurality of frequencies, a plurality of waveform types, or any combination thereof.

Aspect 5: The method of aspect 4, further comprising: determining first timing information based at least in part on the first portion of the synchronization signal block, wherein the first timing information supports a first timing resolution based at least in part on the first waveform type; and receiving, after processing the second portion and based at least in part on determining the first timing information, a data transmission comprising symbols having a duration, wherein the first timing resolution supports the duration of the symbols.

Aspect 6: The method of aspect 5, wherein a duration of the first portion is equivalent to a duration of each time window of the plurality of time windows and greater than the duration of the symbols of the data transmission.

Aspect 7: The method of any of aspects 1 through 6, wherein the first waveform type is one of a single carrier waveform type, a single carrier-frequency division multiplexing type, or an orthogonal frequency division multiplexing type, and the second waveform type is one of the single carrier waveform type, the single carrier-frequency division multiplexing type, or the orthogonal frequency division multiplexing type.

Aspect 8: The method of any of aspects 1 through 6, wherein the synchronization signal block comprises a third portion generated in accordance with a third waveform type, the method further comprising: determining the third waveform type for the third portion based at least in part on determining the first waveform type, determining the second waveform type, an indication of the first waveform type included in the first portion, an indication of the second waveform type included in the second portion, a configuration of the UE, a frequency of the transmission of the synchronization signal block, an order of the first portion relative to the second portion, or any combination thereof.

Aspect 9: The method of any of aspects 1 through 6 and 8, wherein the synchronization signal block comprises a third portion generated in accordance with a third waveform type, the processing further comprising: processing the third portion based at least in part on information obtained from the first portion.

Aspect 10: The method of aspect 9, wherein the first waveform type is one of a single carrier waveform type or an orthogonal frequency division multiplexing type, the second waveform type is one of the single carrier waveform type or the orthogonal frequency division multiplexing type, and the third waveform type is one of a single carrier-frequency division multiplexing type, the single carrier waveform type, or the orthogonal frequency division multiplexing type.

Aspect 11: The method of any of aspects 9 through 10, wherein the first waveform type is a single carrier waveform type, the second waveform type is an orthogonal frequency division multiplexing type, and the third waveform type is a single carrier-frequency division multiplexing type.

Aspect 12: The method of any of aspects 9 through 11, wherein the third portion of the synchronization signal block is transmitted using a first set of subcarriers and multiplexed with a second transmission that is transmitted using a second set of subcarriers.

Aspect 13: A method for wireless communication at a base station, comprising: determining a first waveform type to use for a first portion of a synchronization signal block and a second waveform type to use for a second portion of the synchronization signal block, the second waveform type being different than the first waveform type; generating the first portion and the second portion of the synchronization signal block based at least in part on the determining; and transmitting the synchronization signal block based at least in part on the generating.

Aspect 14: The method of aspect 13, further comprising: transmitting a data transmission to a UE, wherein the first waveform type is determined based at least in part on a duration of symbols included in the data transmission, a duration of the synchronization signal block, power characteristics of the synchronization signal block, or any combination thereof.

Aspect 15: The method of any of aspects 13 through 14, wherein determining the first waveform type comprises selecting the first waveform type based at least in part on a carrier frequency associated with transmitting the synchronization signal block, determining the second waveform type comprises selecting the second waveform type based at least in part on the carrier frequency associated with transmitting the synchronization signal block, or both.

Aspect 16: The method of any of aspects 13 through 15, wherein determining the first waveform type and the second waveform type comprises: selecting the first waveform type from one of a single carrier waveform type or an orthogonal frequency division multiplexing type; and selecting, based at least in part on selecting the first waveform type, the second waveform type from one of the single carrier waveform type or the orthogonal frequency division multiplexing type.

Aspect 17: The method of any of aspects 13 through 16, further comprising: selecting a single carrier waveform type for the first waveform type, wherein generating the synchronization signal block comprises generating a time-domain sequence for the first portion based at least in part on selecting the single carrier waveform type.

Aspect 18: The method of aspect 17, wherein the time-domain sequence indicates the second waveform type used for the second portion of the synchronization signal block.

Aspect 19: The method of any of aspects 13 through 18, wherein determining the first waveform type and the second waveform type further comprises: determining a third waveform type to use for a third portion of the synchronization signal block, wherein the third portion is associated with a physical broadcast channel.

Aspect 20: The method of aspect 19, wherein determining the third waveform type comprises: selecting the third waveform type from one of a single carrier-frequency division multiplexing type, a signal carrier type, or an orthogonal frequency division multiplexing type.

Aspect 21: The method of any of aspects 19 through 20, further comprising: mapping the third portion of the synchronization signal block to a first subset of frequency resources; and mapping a transmission associated with a different communication channel to a second subset of the frequency resources that is different than the first subset of the frequency resources.

Aspect 22: The method of aspect 21, further comprising: applying a discrete Fourier transform to a first set of symbols associated with the third portion and a second set of symbols associated with the different communication channel to obtain a set of frequency-domain symbols, wherein mapping the third portion of the synchronization signal block and the transmission associated with the different communication channel comprising mapping the set of frequency-domain symbols to the frequency resources.

Aspect 23: The method of any of aspects 21 through 22, further comprising: applying a first discrete Fourier transform to a first set of symbols associated with the third portion to obtain a first set of frequency-domain symbols; and applying a second discrete Fourier transform to a second set of symbols associated with the transmission associated with the different communication channel to obtain a second set of frequency-domain symbols, wherein mapping the third portion of the synchronization signal block and the transmission associated with the different communication channel comprising mapping the first set of frequency-domain symbols and the second set of frequency-domain symbols to the frequency resources.

Aspect 24: The method of aspect 23, wherein a quantity of the first set of frequency-domain symbols is less than a quantity of the second set of frequency-domain symbols.

Aspect 25: An apparatus for wireless communication at a UE, comprising: a processor; memory coupled with the processor; and instructions stored in the memory and executable by the processor to cause the apparatus to perform a method of any of aspects 1 through 12.

Aspect 26: An apparatus for wireless communication at a UE, comprising at least one means for performing a method of any of aspects 1 through 12.

Aspect 27: A non-transitory computer-readable medium storing code for wireless communication at a UE, the code comprising instructions executable by a processor to perform a method of any of aspects 1 through 12.

Aspect 28: An apparatus for wireless communication at a base station, comprising a processor; memory coupled with the processor; and instructions stored in the memory and executable by the processor to cause the apparatus to perform a method of any of aspects 13 through 24.

Aspect 29: An apparatus for wireless communication at a base station, comprising at least one means for performing a method of any of aspects 13 through 24.

Aspect 30: A non-transitory computer-readable medium storing code for wireless communication at a base station, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
    monitoring communication resources for synchronization signal block transmissions; and
    receiving, based at least in part on the monitoring, a synchronization signal block that comprises a first portion generated in accordance with a first waveform type, a second portion generated in accordance with a second waveform type that is different than the first waveform type, and a third portion generated in accordance with a third waveform type that is different from the first waveform type and the second waveform type, wherein the first portion comprises a primary synchronization signal, the second portion comprises a secondary synchronization signal, and the third portion comprises a physical broadcast channel, and wherein receiving the synchronization signal block comprises:
        detecting, based at least in part on the monitoring, the first portion of the synchronization signal block based at least in part on the first waveform type; and
        processing, based at least in part on the detecting, the second portion of the synchronization signal block in accordance with the second waveform type based at least in part on information obtained from the first portion.

2. The method of claim 1, further comprising:
    determining the first waveform type for the first portion based at least in part on a configuration of the UE, a frequency of the synchronization signal block, or both.

3. The method of claim 2, further comprising:
    determining the second waveform type for the second portion based at least in part on determining the first waveform type for the first portion, an indication of the second waveform type included in the first portion, the configuration of the UE, the frequency of the synchronization signal block, or any combination thereof.

4. The method of claim 1, wherein monitoring for the synchronization signal block transmissions comprises:
    testing, for each time window of a plurality of time windows, a plurality of hypotheses associated with detecting the first portion of the synchronization signal block, the plurality of hypotheses comprising a plurality of sequences, a plurality of frequencies, a plurality of waveform types, or any combination thereof.

5. The method of claim 4, further comprising:
    determining first timing information based at least in part on the first portion of the synchronization signal block, wherein the first timing information supports a first timing resolution based at least in part on the first waveform type; and
    receiving, after processing the second portion and based at least in part on determining the first timing information, a data transmission comprising symbols having a duration, wherein the first timing resolution supports the duration of the symbols.

6. The method of claim 5, wherein a duration of the first portion is equivalent to a duration of each time window of the plurality of time windows and greater than the duration of the symbols of the data transmission.

7. The method of claim 1, further comprising:
determining the third waveform type for the third portion based at least in part on determining the first waveform type, determining the second waveform type, an indication of the first waveform type included in the first portion, an indication of the second waveform type included in the second portion, a configuration of the UE, a frequency of the synchronization signal block, an order of the first portion relative to the second portion, or any combination thereof.

8. The method of claim 1, further comprising:
processing the third portion based at least in part on information obtained from the first portion.

9. The method of claim 1, wherein the first waveform type is a single carrier waveform type, the second waveform type is an orthogonal frequency division multiplexing type, and the third waveform type is a single carrier-frequency division multiplexing type.

10. The method of claim 1, wherein the third portion of the synchronization signal block is transmitted using a first set of subcarriers and multiplexed with a second transmission that is transmitted using a second set of subcarriers.

11. A method for wireless communication at a network entity, comprising:
determining a first waveform type to use for a first portion of a synchronization signal block, a second waveform type to use for a second portion of the synchronization signal block, and a third waveform type to use for a third portion of the synchronization signal block, wherein the first portion comprises a primary synchronization signal, the second portion comprises a secondary synchronization signal, and the third portion comprises a physical broadcast channel, and wherein the second waveform type is different than the first waveform type and the third waveform type is different from the first waveform type and the second waveform type;
generating, based at least in part on the determining, the first portion of the synchronization signal block in accordance with the first waveform type, the second portion of the synchronization signal block in accordance with the second waveform type, and the third portion of the synchronization signal block in accordance with the third waveform type; and
transmitting the synchronization signal block based at least in part on the generating.

12. The method of claim 11, further comprising:
transmitting a data transmission to a user equipment (UE), wherein the first waveform type is determined based at least in part on a duration of symbols included in the data transmission, a duration of the synchronization signal block, power characteristics of the synchronization signal block, or any combination thereof.

13. The method of claim 11, wherein:
determining the first waveform type comprises selecting the first waveform type based at least in part on a carrier frequency associated with transmitting the synchronization signal block, and
determining the second waveform type comprises selecting the second waveform type based at least in part on the carrier frequency associated with transmitting the synchronization signal block, or both.

14. The method of claim 11, wherein determining the first waveform type and the second waveform type comprises:
selecting a single carrier waveform type for the first waveform type from among the single carrier waveform type and an orthogonal frequency division multiplexing type; and
selecting, based at least in part on selecting the first waveform type, the orthogonal frequency division multiplexing type for the second waveform type.

15. The method of claim 11, further comprising:
selecting a single carrier waveform type for the first waveform type,
wherein generating the synchronization signal block comprises generating a time-domain sequence for the first portion based at least in part on selecting the single carrier waveform type.

16. The method of claim 15, wherein the time-domain sequence indicates the second waveform type used for the second portion of the synchronization signal block.

17. The method of claim 11, wherein determining the third waveform type comprises:
selecting the third waveform type from among a single carrier-frequency division multiplexing type or an orthogonal frequency division multiplexing type.

18. The method of claim 11, further comprising:
mapping the third portion of the synchronization signal block to a first subset of frequency resources; and
mapping a transmission associated with a different communication channel to a second subset of the frequency resources that is non-overlapping with the first subset of the frequency resources.

19. The method of claim 18, further comprising:
applying a discrete Fourier transform to a first set of symbols associated with the third portion and a second set of symbols associated with the different communication channel to obtain a set of frequency-domain symbols,
wherein mapping the third portion of the synchronization signal block and the transmission associated with the different communication channel comprising mapping the set of frequency-domain symbols to the frequency resources.

20. The method of claim 18, further comprising:
applying a first discrete Fourier transform to a first set of symbols associated with the third portion to obtain a first set of frequency-domain symbols; and
applying a second discrete Fourier transform to a second set of symbols associated with the transmission associated with the different communication channel to obtain a second set of frequency-domain symbols,
wherein mapping the third portion of the synchronization signal block and the transmission associated with the different communication channel comprising mapping the first set of frequency-domain symbols and the second set of frequency-domain symbols to the frequency resources.

21. The method of claim 20, wherein a quantity of the first set of frequency-domain symbols is less than a quantity of the second set of frequency-domain symbols.

22. An apparatus for wireless communication at a user equipment (UE), comprising:
a processor;
memory coupled with the processor; and
instructions stored in the memory and executable by the processor to cause the apparatus to:
monitor communication resources for synchronization signal block transmissions; and receive, based at least in part on the monitoring, a synchronization signal block that comprises a first portion generated in accordance with a first waveform type, a second portion generated in accordance with a second waveform type that is different than the first waveform type, and a third portion generated in accordance with a third waveform type that is different from the first waveform type and the second waveform type, wherein the first portion comprises a primary synchronization signal, the second portion comprises a secondary synchronization signal, and the third portion comprises a physical broadcast channel, and wherein to receive the synchronization signal block, the instructions are further executable by the processor to cause the apparatus to:

detect, based at least in part on the monitoring, the first portion of the synchronization signal block based at least in part on the first waveform type; and process, based at least in part on the detecting, the second portion of the synchronization signal block in accordance with the second waveform type based at least in part on information obtained from the first portion.

23. The apparatus of claim 22, wherein the instructions are further executable by the processor to cause the apparatus to:

determine the first waveform type for the first portion based at least in part on a configuration of the UE, a frequency of the synchronization signal block, or both.

24. The apparatus of claim 23, wherein the instructions are further executable by the processor to cause the apparatus to:

determine the second waveform type for the second portion based at least in part on determining the first waveform type for the first portion, an indication of the second waveform type included in the first portion, the configuration of the UE, the frequency of the synchronization signal block, or any combination thereof.

25. The apparatus of claim 22, wherein the instructions to monitor for the synchronization signal block transmissions are executable by the processor to cause the apparatus to:

test, for each time window of a plurality of time windows, a plurality of hypotheses associated with detecting the first portion of the synchronization signal block, the plurality of hypotheses comprising a plurality of sequences, a plurality of frequencies, a plurality of waveform types, or any combination thereof.

26. An apparatus for wireless communication at a network entity, comprising:

a processor;

memory coupled with the processor; and instructions stored in the memory and executable by the processor to cause the apparatus to:

determine a first waveform type to use for a first portion of a synchronization signal block, a second waveform type to use for a second portion of the synchronization signal block, and a third waveform type to use for a third portion of the synchronization signal block, wherein the first portion comprises a primary synchronization signal, the second portion comprises a secondary synchronization signal, and the third portion comprises a physical broadcast channel, and wherein the second waveform type is different than the first waveform type and the third waveform type is different from the first waveform type and the second waveform type;

generate, based at least in part on the determining, the first portion of the synchronization signal block in accordance with the first waveform type, the second portion of the synchronization signal block in accordance with the second waveform type, and the third portion of the synchronization signal block in accordance with the third waveform type; and transmit the synchronization signal block based at least in part on the generating.

27. The apparatus of claim 26, wherein the instructions are further executable by the processor to cause the apparatus to:

transmit a data transmission to a user equipment (UE), wherein the first waveform type is determined based at least in part on a duration of symbols included in the data transmission, a duration of the synchronization signal block, power characteristics of the synchronization signal block, or any combination thereof.

\* \* \* \* \*